US012738092B2

(12) United States Patent
Riggan et al.

(10) Patent No.: US 12,738,092 B2
(45) Date of Patent: Sep. 15, 2026

(54) LEARNING DOMAIN AND POSE INVARIANCE FOR THERMAL-TO-VISIBLE FACE RECOGNITION

(71) Applicant: NUtech Ventures, Lincoln, NE (US)

(72) Inventors: Benjamin S. Riggan, Lincoln, NE (US); Cedric Nimpa Fondje, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 565 days.

(21) Appl. No.: 18/300,920

(22) Filed: Apr. 14, 2023

(65) Prior Publication Data

US 2023/0334899 A1 Oct. 19, 2023

Related U.S. Application Data

(60) Provisional application No. 63/331,112, filed on Apr. 14, 2022.

(51) Int. Cl.
*G06V 40/16* (2022.01)
*G06V 10/774* (2022.01)
*G06V 10/82* (2022.01)

(52) U.S. Cl.
CPC .......... *G06V 40/165* (2022.01); *G06V 10/774* (2022.01); *G06V 10/82* (2022.01); *G06V 40/171* (2022.01); *G06V 40/172* (2022.01)

(58) Field of Classification Search
CPC .... G06V 10/774; G06V 10/82; G06V 40/165; G06V 40/171; G06V 40/172
See application file for complete search history.

(56) References Cited

PUBLICATIONS

Zhang et al: "Synthesis of High-Quality Visible Faces from Polarimetric Thermal Faces using Generative Adversarial Networks", Int.. J. Computer Vision, 2019 (Year: 2019).*

Mallat et al: "Cross-spectrum thermal to visible face recognition based on cascaded image synthesis", IEEE, 2019 (Year: 2019).*

Cao, K., t al. (2018). "Pose-robust face recognition via deep residual equivariant mapping," In Proceedings of the IEEE Conference on Computer Vision and Pattern Recognition, (pp. 5187-5196).

Di, X., et al. (2018). "Polarimetric thermal to visible face verification via attribute preserved synthesis." 2018 IEEE 9th International Conference on Biometrics Theory, Applications and Systems (BTAS) (pp. 1-10).

(Continued)

*Primary Examiner* — Ruiping Li

(74) *Attorney, Agent, or Firm* — QUARLES & BRADY LLP

(57) ABSTRACT

A method and system for cross-spectrum face recognition is disclosed. The system for off-pose cross-spectrum to frontal visible face matching, which used modified base architectures to extract image representations along with a new sub-network to simultaneously learn pose and domain invariance using new joint-loss function that combines proposed pose-correction and cross-spectrum losses. The system and method demonstrate significant improvements over state-of-the-art domain adaptation methods not only on pose conditions, but also on baseline and varying expressions. Other aspects, embodiments, and features are also claimed and described.

19 Claims, 12 Drawing Sheets

(56) References Cited

PUBLICATIONS

Di, X., et al. (2021). "Heterogeneous face frontalization via domain agnostic learning". In 2021 16th IEEE International Conference on Automatic Face and Gesture Recognition (FG 2021) (pp. 01-08).
Immidisetti, R., et al. (2021). "Simultaneous face hallucination and translation for thermal to visible face verification using axial-gan". In 2021 IEEE International Joint Conference on Biometrics (IJCB) (pp. 1-8).
Fondje, C. N., et al. (2020). "Cross-domain identification for thermal-to-visible face recognition". In 2020 IEEE International Joint Conference on Biometrics (IJCB) (pp. 1-9).
Fondje, C. N., et al. (2023). "Learning domain and pose invariance for thermal-to-visible face recognition." EEE Trans. on Biometric, Behavior, and Identity Science (TBIOM), vol. 5, No. 1, (pp. 1-14).
Zhang, H., et al. (2017). "Generative adversarial network-based synthesis of visible faces from polarimetrie thermal faces". In 2017 IEEE International Joint Conference on Biometrics (IJCB) (pp. 100-107).
Zhang, H. et al. (2019). "Synthesis of high-quality visible faces from polarimetric thermal faces using generative adversarial networks". International Journal of Computer Vision vol. 127, (pp. 845-862).

* cited by examiner

100

LEARNING DOMAIN AND POSE INVARIANCE FOR THERMAL-TO-VISIBLE FACE RECOGNITION

CROSS-REFERENCE TO RELATED APPLICATIONS

This application claims the benefit of U.S. Provisional Patent Application Ser. No. 63/331,112, filed Apr. 14, 2022, the disclosure of which is hereby incorporated by reference in its entirety, including all figures, tables, and drawings.

STATEMENT OF GOVERNMENT SUPPORT

N/A

BACKGROUND

Face Recognition (FR) is a widely used biometric modality due to its ease of acquisition and non-invasive nature in conjunction with its high accuracy. Although FR systems still require a minimum interocular distance (IOD), e.g., greater than 60 pixels between the eyes, using faces for identification has the advantage of larger standoff acquisition compared to iris and fingerprint modalities. For example, many consumer electronics, social media platforms, military surveillance tools, and law enforcement surveillance tools have incorporated face identification and/or face verification capabilities.

FR has improved over recent decades due to the availability of large-scale annotated face datasets and the growth of modern deep learning models. However, many conventional FR systems perform matching in the visible spectrum based on frontal-to-frontal face matching, and are not effective in low light environments or when a subject is not facing the camera. As the demand for FR continues to increase, research and development continue to advance FR technologies not only to meet the growing demand for FR, but to advance and enhance the FR system used in various environments.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method, a system, and/or an apparatus for cross-spectrum face recognition is disclosed. The method, the system implementing the method, and/or the apparatus implementing the method may include receiving a visible image of a person; receiving a cross-spectrum image of the person; training a neural network based on the visible image and the cross-spectrum image by: extracting a first representation from the visible image using a modified neural network architecture; extracting a second representation from the cross-spectrum image based on the modified neural network architecture; converting the second representation to a modified representation using a domain adaptation sub-network, the domain adaptation sub-network comprising: a first residual block and a second residual block being immediately subsequent to the first residual block, the first residual block having the second representation as an input, the second residual block having the second representation and an output of the first residual block as an input, the modified representation being based on the second representation, the output of the first residual block, and an output of the second block; and updating parameters of the neural network based on the modified representation.

In another example, a method, a system, and/or an apparatus for cross-spectrum face recognition is disclosed. The method, the system implementing the method, and/or the apparatus implementing the method may include receiving a cross-spectrum image of a person among the people in the visible imagery; providing the cross-spectrum image to a trained neural network, the trained neural network comprising: a trained feature extraction convolutional neural network (CNN); and a domain adaptation sub-network, the domain adaptation sub-network converting a cross-spectrum representation of the cross-spectrum image generated by the trained feature extraction CNN to a modified representation; receiving, from the trained neural network, a representation of the cross-spectrum image; predicting an identity of the person in the cross-spectrum image based on a comparison of the representation of the cross-spectrum image and a representation of a visible image of the person in the visible imagery; and presenting the identity the person in the cross-spectrum image.

In a further example, a method, a system, and/or an apparatus for face recognition is disclosed. The method, the system implementing the method, and/or the apparatus implementing the method may include receiving an off-pose visible spectrum image of a person among the people in the visible imagery; providing the off-pose visible spectrum image to a trained neural network, the trained neural network comprising: a trained feature extraction convolutional neural network (CNN); and a domain adaptation sub-network, the domain adaptation sub-network converting an off-pose representation of the off-pose visible spectrum image generated by the trained feature extraction CNN to a modified representation; receiving, from the trained neural network, the modified representation of the off-pose visible spectrum image; predicting an identity of the person in the off-pose visible spectrum image based on a comparison of the representation of the off-pose visible spectrum image and a representation of a visible image of the person in the visible imagery; and presenting the identity the person in the off-pose image.

These and other aspects of the invention will become more fully understood upon a review of the detailed description, which follows. Other aspects, features, and embodiments of the present invention will become apparent to those of ordinary skill in the art, upon reviewing the following description of specific, example embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while example embodiments may be discussed below as device, system, or method embodiments it should be understood that such example embodiments can be implemented in various devices, systems, and methods.

DETAILED DESCRIPTION

Figure 1:
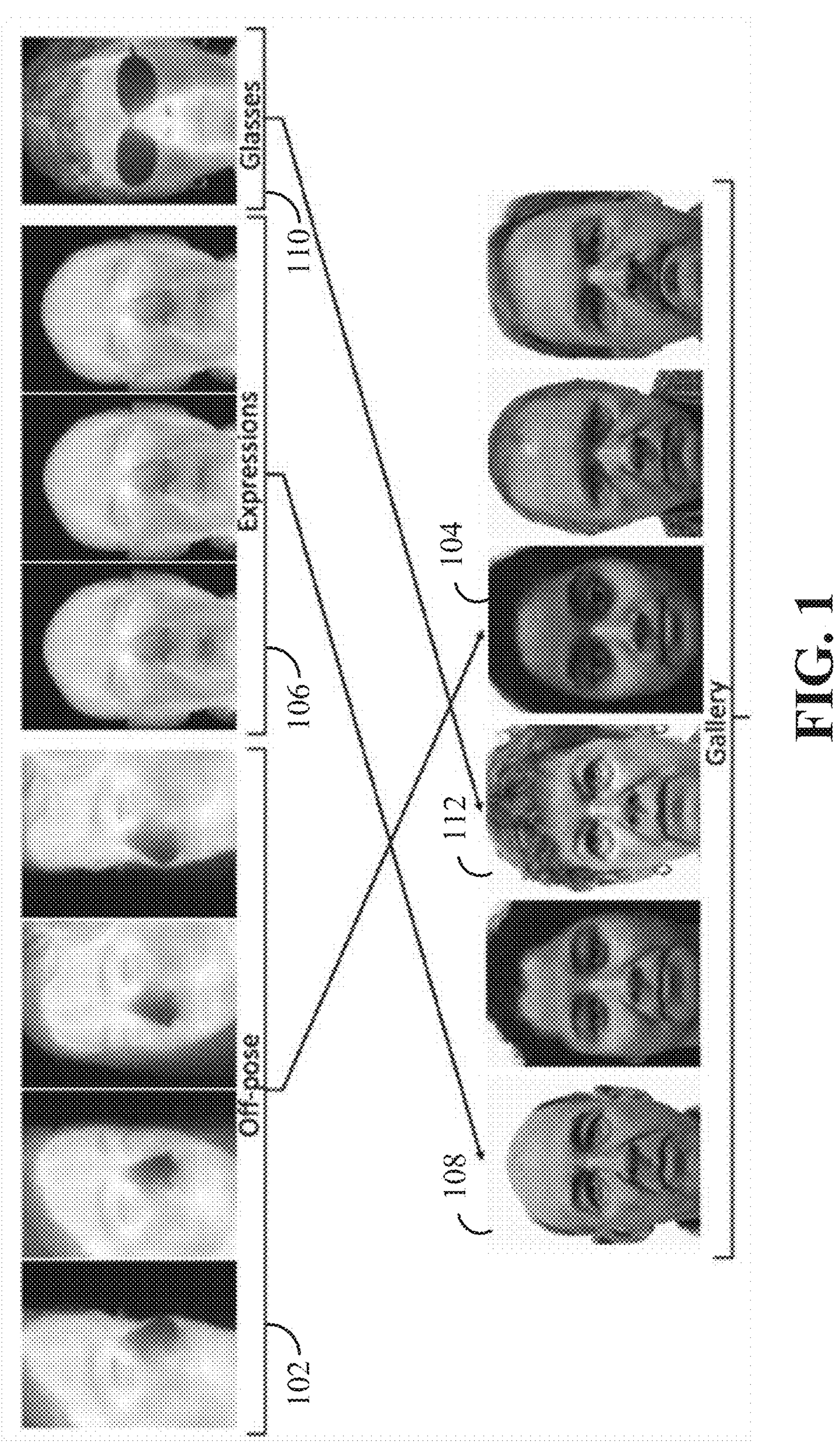
FIG. 1 is an illustration of an example of thermal-to-visible face matching results according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

1. Introduction emerging cross-spectrum FR capabilities have not yet reached sufficient accuracy, especially under variable poses, to be deployed for operational use. Thus, due to the large discrepancy between visible and cross-spectrum imagery, it is difficult for existing approaches to match cross-spectrum imagery to visible imagery.

Despite recent advances toward perspective invariance, large pose variations between probe and gallery face images still result in decreased face recognition performance. For example, most FR models exhibit a drop in performance of at least 10% in profile-to-frontal face matching compared to frontal-to-frontal face matching in the visible spectrum. This drop becomes more significant when matching faces across different spectra.

The present disclosure elaborates face recognition by presenting an example domain adaptation framework that is simultaneously robust to both spectra and pose. The design hypothesis of the example framework assumes that there exists a pose invariant mapping between the visible and the cross-spectrum image representations and the framework aims to learn a such mapping. The example framework not only addresses matching non-frontal thermal face imagery (probe samples) with frontal visible imagery (gallery samples), but also indirectly enhances frontal thermal-to-visible FR. the example domain adaptation framework can simultaneously learn domain and pose invariant representations. Note that concepts described herein can be used to match non-frontal visible imagery with frontal visible imagery using the example domain adaptation framework.

In addition, the example framework can learn invariant representation as this is typically less complex to implement (e.g., no discriminator networks and no decoding network) than image-to-image translation, which aims to synthesize visible faces from the corresponding thermal faces, then extract embedding representations from both synthesized visible image and visible gallery imagery.

When comparing invariant representation techniques described herein with other recent image-to-image translation techniques, techniques described herein achieve better discriminability overall. The proposed domain adaptation framework can include a feature extraction block for extracting the most correlated intermediate representations from off-pose thermal and frontal visible face imagery; a sub-network that learns the mapping between the extracted thermal features and the visible features to jointly bridge domain and pose gaps; and/or a combination of cross-spectrum loss and/or pose-correction loss to guide the features during the identification process. In some embodiments, techniques described herein can generate a representation in the embedding space that represents a frontalization in the embedding space Moreover, the example approach extends beyond a naive combination of frontalization and cross-spectrum transformation by seamlessly addressing both domain and pose gaps at the same time. In some embodiments, concepts described herein can be used to implement a domain adaptation framework for thermal-to-visible FR that is robust to pose variations. For example, concepts described herein can utilize a modified base architecture (e.g., VGG16, Resnet50) to extract correlated and invariant representations across thermal and visible domain. As another example, concepts described herein can utilize a feature mapping sub-network, sometimes referred to herein as a domain and pose invariance transform (DPIT), which can bridge domain and pose gaps between extracted image representations. As yet another example, concepts described herein can utilize a joint loss function—a linear combination of cross-spectrum and the pose-correction losses—which can preserve identity across thermal and visible domain and encourage pose invariance in the embedding space. As still another example, concepts described herein can utilize extensive analysis using ARL-VTF, ARL-MMF Face, and Tufts Face datasets to compare the proposed approach against recent state-of-the-art approaches; and/or ablation studies for understanding the effects of embedding size and pose-correction loss on face verification performance.

When comparing models implemented in accordance with concepts described herein to other invariant representations techniques, and image-to-image translation techniques, the models achieve superior results when matching profile thermal face imagery to frontal visible face imagery on ARL-VTF, ARL-MMF, and Tufts Face datasets.

2. Example Technique

In the disclosure, a cross-spectrum face frontalization model is elaborated, instead of synthesizing the frontal visible face from the thermal profile face our model perform frontalization in the feature space. Also, on the contrary of the deep residual equivalent mapping (DREAM) model that leverages the pose information during the frontalization process, the example pose-correction loss increases the similarity between frontal and profile image representations without any explicit dependence on pose information, fiducial landmarks, or 3D models and jointly optimizes the cross-spectrum and pose-correction losses to simultaneously reduce both domain and pose variations.

Specifically, the example framework includes the modified base architecture, the DPIT sub-network that performs cross-spectrum face frontalization, the cross-spectrum and pose correction loss functions. In addition, this section elaborates how these components interact with each other to yield the example framework. FIG. 1 shows an illustration of an example of thermal-to-visible face matching results using the example framework. For example, the example framework may match off-pose thermal images 102, images with varying expressions, and images having glasses with frontal visible face images 104, 106, 110, respectively. In some examples, thermal probe imagery 102, 106, 110 and visible gallery imagery 104, 108, 112 may be both sampled from ARL-VTF dataset.

A. Modified Base Architectures

In some embodiments, a base architecture used to extract discriminative image representations from off-pose thermal and frontal visible imagery can be based on any suitable CNN. For example, a base architecture used to extract discriminative image representations from off-pose thermal and frontal visible imagery can be based on Resnet50 or VGG16 architectures (e.g., as described below in connection with Table. I), which may be used for FR applications.

TABLE I

Reference notations for base architectures, where the number (e.g., 1) indicates the block number and the letter (e.g., a) indicates the group of convolutional operators within each block. Each block is given as a group of convolution and/or pooling operators with filters of size H × W followed by '$c_{out}$/s' indicating number of filters and stride, respectively. The rightmost '×p' notation specifies the number of convolutional groups per block.

| ResNet50 | | VGG16 | |
|---|---|---|---|
| Blocks | Operations | Blocks | Operations |
| 1a | $\begin{bmatrix} 7\times 7,\ 64/2 \\ 3\times 3\ \text{Pool} \end{bmatrix}\times 1$ | 1 | $\begin{bmatrix} 3\times 3,\ 64/1 \\ 3\times 3,\ 64/1 \\ 2\times 2\ \text{Pool} \end{bmatrix}\times 1$ |
| 2a-c | $\begin{bmatrix} 1\times 1,\ 64/1 \\ 3\times 3,\ 64/1 \\ 1\times 1,\ 256/1 \end{bmatrix}\times 3$ | 2 | $\begin{bmatrix} 3\times 3,\ 128/2 \\ 3\times 3,\ 128/2 \\ 2\times 2\ \text{Pool} \end{bmatrix}\times 1$ |

TABLE I-continued

Reference notations for base architectures, where the number (e.g., 1) indicates the block number and the letter (e.g., a) indicates the group of convolutional operators within each block. Each block is given as a group of convolution and/or pooling operators with filters of size H × W followed by '$c_{out}$/s' indicating number of filters and stride, respectively. The rightmost '×p' notation specifies the number of convolutional groups per block.

| ResNet50 | | VGG16 | |
|---|---|---|---|
| Blocks | Operations | Blocks | Operations |
| 3a-d | $\begin{bmatrix} 1\times 1,\ 128/2 \\ 3\times 3,\ 128/1 \\ 1\times 1,\ 512/1 \end{bmatrix}\times 4$ | 3 | $\begin{bmatrix} 3\times 3,\ 256/2 \\ 3\times 3,\ 256/2 \\ 3\times 3,\ 256/2 \\ 2\times 2\ \text{Pool} \end{bmatrix}\times 1$ |
| 4a-f | $\begin{bmatrix} 1\times 1,\ 256/2 \\ 3\times 3,\ 256/1 \\ 1\times 1,\ 1024/1 \end{bmatrix}\times 6$ | 4 | $\begin{bmatrix} 3\times 3,\ 512/2 \\ 3\times 3,\ 512/2 \\ 3\times 3,\ 512/2 \\ 2\times 2\ \text{Pool} \end{bmatrix}\times 1$ |
| 5a-c | $\begin{bmatrix} 1\times 1,\ 512/2 \\ 3\times 3,\ 512/1 \\ 1\times 1,\ 2048/1 \end{bmatrix}\times 3$ | 5 | $\begin{bmatrix} 3\times 3,\ 512/2 \\ 3\times 3,\ 512/2 \\ 3\times 3,\ 512/2 \\ 2\times 2\ \text{Pool} \end{bmatrix}\times 1$ |

In some examples, the raw features output by complete VGG16 and Resnet50 networks may be less transferable across the visible and the thermal spectrum due to being trained on large-scale visible imagery with rich textural information that is not present in thermal imagery. Since the deep layers in these architectures are most sensitive to the high frequency content representing the fine textural facial details, the best intermediate level feature maps may be determined to use for cross-spectrum matching. Therefore, by truncating the base architectures such that the receptive fields are maximized and the extracted visible and thermal image representations are most similar, potential over-fitting to discriminative domain-dependent information (e.g., visible textures) that are absent from thermal face imagery can be mitigated.

For example, in an experiment using Resnet50, the most effective block for thermal off-pose to visible frontal matching was the fifth convolutional group from the fourth residual block (i.e., 'block 4e' in Table I). In further examples, the features extracted from the fourth convolutional-pooling block (i.e., 'block4 pool') of VGG16 provided better performance in cross-spectrum matching than other convolutional blocks in VGG16. Truncated VGG16 and truncated Resnet50 can be used to initially extract common features to match profile thermal face imagery with corresponding frontal visible face imagery. The optimal feature map dimensions (H×W×C—height by width by channels) may be determined for matching thermal off-pose probes to visible frontal gallery to be 14×14×1024 and 14×14×512 for Resnet50 and VGG16, respectively.

Given an image x from a domain (e.g., visible or thermal), let $$x_m = \Phi_m(x), \tag{Equation 1}$$

denote the feature maps from a modified based architecture where $m \in \{\text{VGG16, ResNet50}\}$ with dimensions H×W×C.

Following the proposed modified based architecture (Equation 1), a shared compression layer which includes a single 1×1 convolutional layer can be applied to both streams. This compression layer reduces the effect of the noise propagation and also reduces the number of learnable parameters in the subsequent layers by compressing the base architecture feature maps in a channel-wise fashion by a factor of 2 (i.e., a 50% compression rate). Note that, in some embodiments, compression layers with any other suitable compression rate can be used (e.g., a compression rate of 75%, 90%, etc.). Moreover, through optimizing this shared layer, the example model can learn a common projection for visible and thermal representations. This compression can be given by $$h(x_m) = \tanh\left(W'_{C/2} \circledast x_m + b'\right), \quad \text{Equation 2}$$

where $\circledast$ represents the convolution operator, $W'_{C/2}$ and b' are convolution kernel and bias parameters, the subscript C/2 denotes the number of output channels, and $\tanh(u)=((\exp(u)-\exp(-u))(\exp(u)+\exp(-u)))^{-1}$ is the hyperbolic tangent activation function with output range (−1, 1).

B. Domain and Pose Invariance Transform (DPIT)

Figure 2:
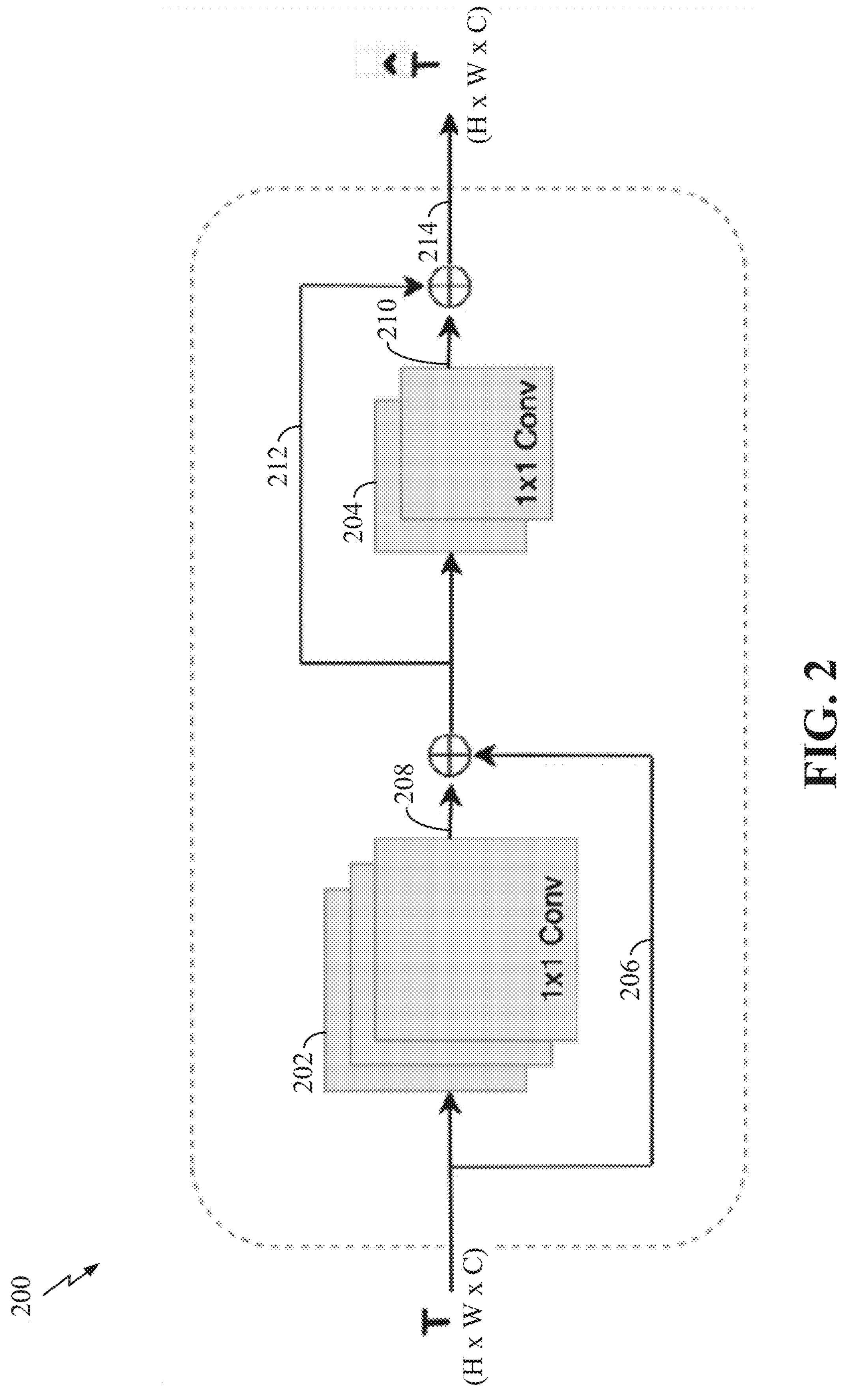
FIG. 2 is an illustration of an example of a domain and pose invariance transform sub-network architecture according to some embodiments.

The DPIT sub-network 200 shown in FIG. 2, includes two consecutive residual blocks 202, 204, which can simultaneously preserve identify information while effectively generating a facial representation that performs face frontalization and cross-domain transformation using face embeddings. The DPIT sub-network transforms the output form the compression layer between thermal and visible representations. These two blocks 202, 204 use 1×1 convolutional layers to map thermal image representations (e.g., corresponding to various different poses) to visible image representation (e.g., corresponding to front-facing poses). Then, a grouped convolution layer can provide additional robustness to pose variations. The first residual block 202 in some examples, can be given by $$\mathcal{F}(x_m^t) = f_c^3 \circ f_{200}^2 \circ f_{200}^1(h(x_m^t)) + h(x_m^t), \quad \text{Equation 3}$$

with $$f_k^l(z) = \tanh\left(W_k^l \circledast z + b^l\right), \quad \text{Equation 4}$$

where the subscript k denotes the number of output units (which can be referred to as channels), $$W_k^l,$$

$b^l$ are convolution kernel and bias parameters for the $l^{th}$ layer, and z represents the input feature maps for layer l. The superscript t in $$x_m^t$$

may be used to specify that the feature maps are extracted from thermal imagery (e.g., as opposed to superscript v for visible imagery). In some examples, the input of the second residual block 204 may include compressed feature maps 206 and convoluted compressed feature maps 208 (e.g., the output of the first residual block).

Similarly, the second residual block 204 in some examples can be given by $$\mathcal{G}(x_m^t) = g_c^2 \circ g_c^1(\mathcal{F}(x_m^t)) + \mathcal{F}(x_m^t), \quad \text{Equation 5}$$

with $$g_k^l(z) = ReLU\left(\overline{W}_k^l \circledast z + \overline{b}^l\right), \quad \text{Equation 6}$$

where the subscript k denotes the number of output units (i.e., channels), $$\overline{W}_k^l$$

and $\overline{b}^l$ are convolution kernel and bias parameters for the $l^{th}$ layer, and ReLU (u)=max (0, u) is the rectified linear unit activation function with output range [0, 1]. In some examples, the output of the DPIT sub-network 200 may include the input 212 of the second residual block 204 (e.g., compressed feature maps 206 and convoluted compressed feature maps 208) and the output 210 of the second residual block 204.

Notice that the two residual blocks 202, 204 in Equations 3 and 5 use two different activation function: tanh and ReLU. In some embodiments, mixing activation functions can be advantageous in this context based on a combination of the capacity limitations due to 1×1 convolutional layers, with activation limits imposed by tanh, and activation sparsity introduced by ReLU. Any suitable combination of tanh and ReLU activation functions can be used, such as tanh followed by tanh, ReLU followed by ReLU, and ReLU followed by tanh. However, of the preceding combinations, in experiments tanh followed by ReLU for the two blocks provided the most discriminative performance for thermal-to-visible FR.

Figure 3:
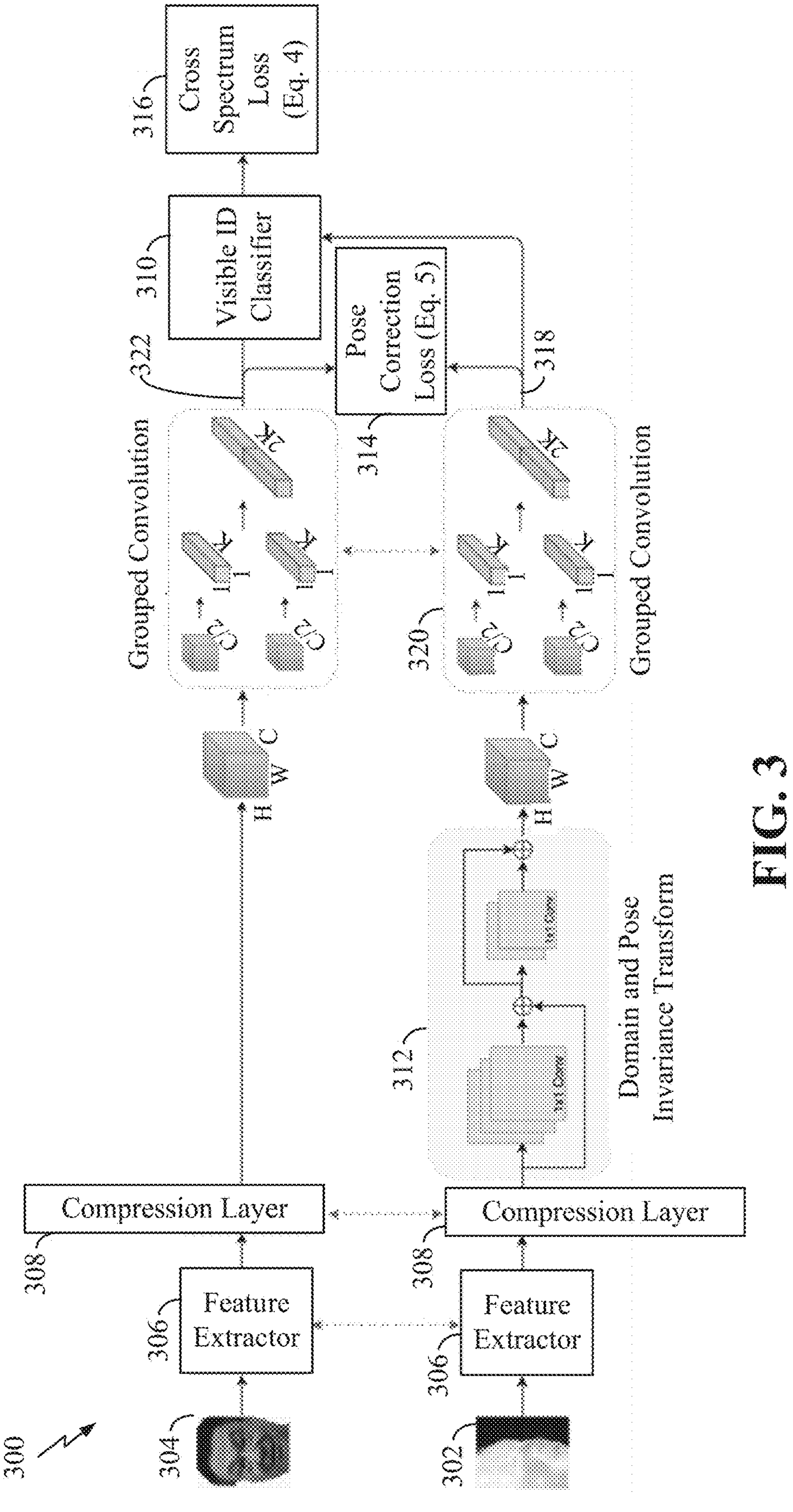
FIG. 3 is an illustration of an example of a network architecture according to some embodiments.

Equation 5 may be defined as the DPIT sub-network, which is illustrated in FIGS. 2 and 3.

Following the DPIT transform for thermal representations and following the compressed visible representation according to Equation 2, both visible and thermal representations are mapped using a shared grouped convolution layer:

$$\Psi(x_m) = ReLU\left(V \circledast_G^n \mathcal{T}(x_m) + c\right), , \quad \text{Equation 7}$$

where $\circledast_G^n$ denotes the grouped convolution with n filter groups, V and c denote the weights and biases, and $\mathcal{T}(x_m)$ represents either $$h(x_m^v)$$

or $$\mathcal{G}(x_m^t)$$

for the visible or thermal streams, respectively.

Since the first two blocks 202, 204 effectively operate on "patches" with particular sizes (which can be referred to as receptive fields) associated with each activation, to increase tolerance to perspective variations, a more holistic image representation can be considered. Given a relatively high likelihood of over-fitting when matching off-pose thermal faces with frontal visible faces, a grouped convolution that uses multiple filter groups can be exploited to reduce number parameters by a factor related to the number of filter groups and to learn complementary filter groups. In some embodiments, the grouped convolution can increase the computational efficiency and decreases the risk of over-fitting while also providing additional robustness to pose. In some examples, n=2 filter groups experimentally worked well within the example framework.

C. Cross-Spectrum Loss

The cross-spectrum loss can be used to ensure that the identity of different subjects is preserved during training by simultaneously learning discriminative features in the thermal spectrum and performing the recognition task against visible spectrum gallery images. The loss can be the objective measure (error) that is optimized when updating underlying deep-learning model parameters. This measure can be used to guide the thermal image representations to be more consistent with visible image representations. Therefore, it facilitates the cross-spectrum mapping. For example, the cross-spectrum loss is a mechanism to determine the discriminative features of the thermal spectrum representation from the visible spectrum representation, and the discriminative features (cross-spectrum loss) are used by the network to learn based on the loss. The cross-spectrum loss can be represented as:

$$\mathcal{L}_C = -\sum y \cdot \log \hat{y}(\Psi(x_m^t); \Theta_v), \qquad \text{Equation 8}$$

where y represents the true identities (labels) and $$\hat{y}(\Psi(x_m^t); \Theta_v)$$

are the predicted identities or labels obtained by feeding feature representations $$\Psi(x_m^t)$$

transformed by the DPIT (e.g., frontalized and 'visible-like' image representation) to a classifier $\hat{y}(\bullet, \Theta_v)$ that is discriminatively trained to perform an identification task using only frontal visible face imagery; mimicking a common constrained enrollment gallery. Therefore, the example cross-spectrum loss may be used to optimize and to enhance the DPIT.

D. Pose-Correction Loss

This loss function aims to push the feature representations from the frontal image and the off-pose face imagery close to each other by minimizing the $L_2$ distance between them. The pose-correction loss can be represented as:

$$\mathcal{L}_{\mathcal{P}} = \sum_i \left\| \Psi(x_{m,i}^v) - \Psi(x_{m,i}^t) \right\|^2, \qquad \text{Equation 9}$$

where $$\Psi(x_{m,i}^v)$$

corresponds to the holistic image representation extracted from frontal visible face imagery and $$\Psi(x_{m,i}^t)$$

is the resulting DPIT transformed representations from off-pose thermal face imagery.

Therefore, the example joint-loss function which combines Equations 8 and 9 is given by:

$$\mathcal{L} = \mathcal{L}_C + \lambda \cdot \mathcal{L}_{\mathcal{P}}, \qquad \text{Equation 10}$$

where λ is the loss parameter. In some examples, the weight (λ) may have the value of $10^{-5}$. However, it should be appreciated that the weight is not limited to the value of $10^{-5}$ and could be any other suitable value.

E. Implementation Details

In some examples, images can be preprocessed before using them for training and/or testing. For the preprocessing, the thermal 302 and visible images 304 can be first registered and then tightly cropped to a 224×224 image around the center of the eyes, the base of the nose, and the corners of the mouth. The example network architecture shown in FIG. 3 can be trained (e.g., in Tensorflow on the Nvidia GeForce RTX 2080 Ti GPU).

During training, the feature extractor block 306 can be made not trainable (e.g., when using either the truncated Resnet50 or VGG16) and the compression at the compression layer 308 can be performed channel-wise at any suitable compression ratio (e.g., a 50% ratio). The visible ID classifier 310 can be trained first to be robust on frontal visible faces using the cross-entropy loss for any suitable number of epochs (e.g., 5 epochs, 10 epochs, etc.). Then, the visible ID classifier 310 can be made not trainable, and the thermal stream can be trained for any suitable number of epochs (e.g., 50 epochs, 100 epochs, 150 epochs, 200 epochs, etc.) using the example DPIT sub-network 312 and loss functions 314, 316. The pose-correction loss 314 can be computed during training by simultaneously feeding, to the thermal stream 302 and the visible 304 stream, the off-pose thermal faces and the corresponding frontal visible faces, respectively. Thus, $\mathcal{L}_{\mathcal{P}}$ can be computed from the actual visible feature representation and the predicted visible representation 318 obtained after the group convolution block

320. The predicted visible representations 318 and the actual visible representations 322 are matched using the cosine similarity measure during inference. In some examples, the weight (i.e., $\lambda$) have the value of $10^{-5}$, and an embedding size of 256 may provide a good trade-off between the model performance and the desirable number of trainable parameters. The values may provide the best trade-off between the model performance and the number of trainable parameters. The effect of varying these two parameters below.

3. Datasets

This section provides a brief description of the different datasets/protocols used to conduct experiments and analysis. More specifically, the ARL-VTF dataset, the ARL-MMF Dataset and the Tufts Face database were used to evaluate the example domain adaptation model, and results of such evaluation are described below in connection with Tables II-IV.

A. ARL Visible-Thermal Face Dataset

The ARL-VTF dataset is one of the largest collection of paired conventional thermal and visible images. The ARL-VTF dataset contains over 500,000 images corresponding to 395 unique subjects among which 295 are in the development set (i.e., training and validation sets) and 100 in the test set. In addition to baseline—frontal with neutral expression—imagery, ARL-VTF includes expression, pose, and eye-wear (e.g., glasses) variations across multiple subjects. Example concepts described herein were evaluated using the provided protocols as described below.

The ARL-VTF dataset includes two gallery sets, denoted as G VB0− and G VB0+. Each gallery set is a collection of visible baseline imagery from 100 subjects. In G VB0− none of the subjects were collected wearing glasses. However, in G VB0+, approximately 30 subjects, who typically wear glasses, were collected wearing their glasses and the remaining 70 subjects were collected without any glasses.

The ARL-VTF probe sets are grouped into baseline, expression, pose, and eye-wear conditions.

Baseline: There are three different probe sets that include baseline thermal imagery subsets from the 100 enrolled subjects: P TB0, P TB−, and P TB+. Here the suffix '0' specifies imagery of subjects who do not have glasses (i.e., 70 subjects), '−' denotes the imagery from subjects who have glass but were not wearing them, and '+' denotes the imagery from subject that have glass and had their glasses on (i.e., 30 subjects). Note that the effect of eye-wear variation in the probe sets is only considered for baseline condition.

Expression: There are two different probe sets that include thermal imagery with varying expressions: P TE0 and P TE−. Similarly, these probe sets are composed of either imagery of subjects who do not have glasses (i.e., 70 subjects) or imagery from subjects who have glass but were not wearing them (i.e., 30 subjects).

Pose: There are two different probe sets that include thermal imagery with varying pose: P TP0 and P TP−.

B. ARL Multimodal Face Dataset

The ARL-MMF dataset Volume III is composed of over 5000 paired thermal and visible images collected at a single range (2.5 m) from 126 subjects. These images include baseline, varying expressions, as well as varying pose from 60○ to +60○. Here, thermal off-pose and visible frontal (including baseline and expression) face pairs were chosen and face imagery from 96 random subjects was considered as the training set and face imagery from the remaining 30 subjects as the test set.

C. Tufts Face Database

This dataset is a multi-modal dataset with over 10,000 face images with pose and expressions variations from 112 subjects from multiple countries. In some examples, a collection of 1532 paired conventional thermal and visible face images can only be considered. For any given subject, there are 9 images with pose variations, 4 with varying expressions and 1 with eyewear. This dataset is challenging as it does not provide as many off-pose imageries compare to the ARL-VTF and ARL-MMF datasets. For training the example framework, images from 90 random subjects can be chosen, and the remaining 22 subjects were used for evaluation. So, 1232 paired images in the training set and 300 paired images are used in the testing set with no subject overlap across the two sets.

4. Experimental Results

This section presents experiments on the datasets described above as well as their respective results to show the effectiveness of concepts described herein. Particularly, the ARL-VTF dataset is used to evaluate example concepts described herein on baseline, expression, and pose conditions as shown in FIG. 1, and the ARL-MMF and Tufts dataset were used to evaluate example concepts on pose conditions to show effectiveness of the pose-correction across different datasets. For each dataset, the example technique's performance is compared to the one of some recent state-of-the-art approaches. In particular, the metrics to evaluate the cross-spectrum performance across the different techniques include Area Under the Curve (AUC), Equal Error Rate (EER), True Acceptance Rate at 1% and 5% False Acceptance Rate (TAR@FAR), as well as Receiver Operating Characteristic (ROC) curves. While these metrics can be computed using a variety of distance or similarity measures, cosine similarity is used to compute the reported metrics for the example concepts described herein.

Additionally, ablation studies were performed to understand (1) the impact of embedding size has on thermal-to-visible FR and the effect model capacity has on performance, (2) the effects of the hyperparameter $\lambda$ and the relative importance of the proposed pose-correction loss for cross-spectrum matching, and (3) the effect of truncating base architectures at various depth. Ablation studies can be performed to show the effect of varying the size of the embedding size as well as the effect of varying the loss parameter $\lambda$.

A. Results on the ARL-VTF Dataset

Figure 4:
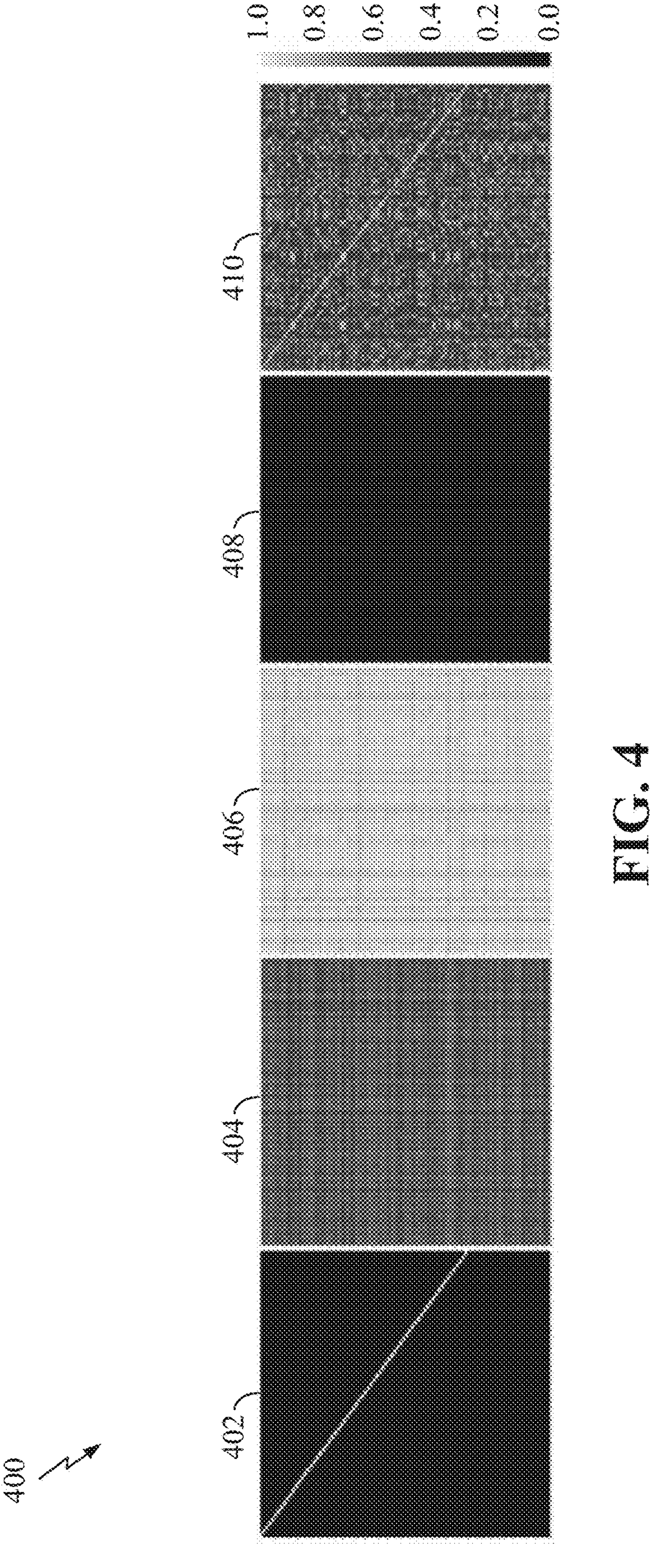
FIG. 4 is an illustration of an example of cosine similarity score matrices according to some embodiments.
Figure 5:
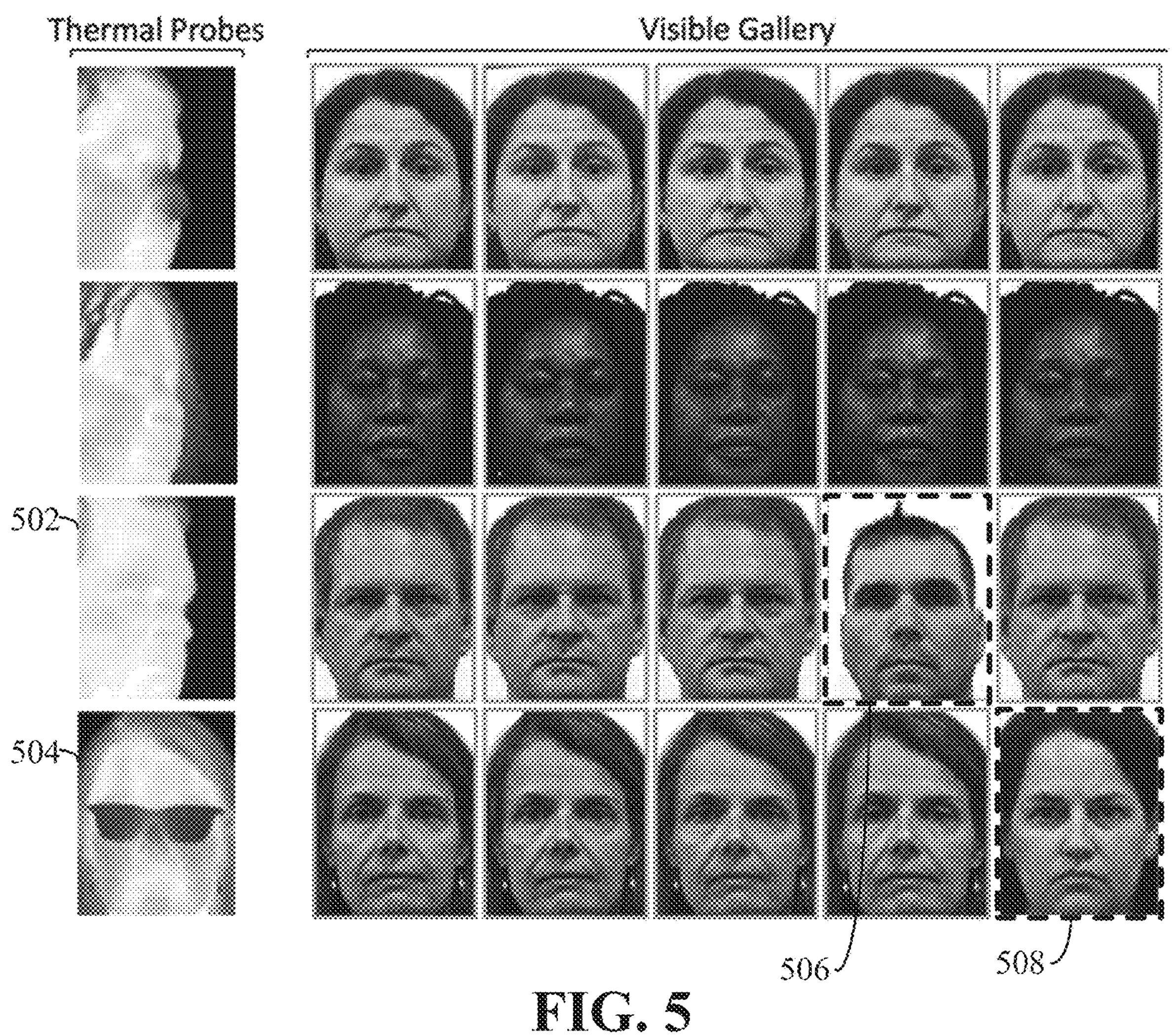
FIG. 5 is an illustration of an example of gallery match verification results for thermal probes with pose and glasses conditions on thermal probes according to some embodiments.

Using this dataset, efficacy of the example concepts described herein can be demonstrated by showing both qualitative and quantitative results. In FIG. 4, visual comparison is shown between a ground-truth 402 scoring matrix and other scoring matrices generated from matching off-pose thermal probes to frontal visible gallery using a raw image representations 404, Dream 406, RST 408, and proposed DPIT 410. In some examples, FIG. 4 shows cosine similarity score matrices using P_TP0/G_VB0 protocol of ARL-VTF. Horizontal and vertical axes represent probe and gallery imagery respectively. From FIG. 4, the example domain adaptation framework provides better matching scores compared to the other techniques. Also, FIG. 5 shows top-5 gallery match for thermal probes with pose and glasses conditions using examples concepts described herein on thermal probes from ARL-VTF dataset. In FIG. 5, the top-5 images are retrieved from the gallery after feeding thermal probes imagery with pose and glasses condition to the proposed framework. In this figure, subject match and mismatch overall, the example framework may still present some false positives 506, 508 (i.e., subject mismatch) specifically for the last two subjects 502, 504 due to extremely challenging conditions exhibited by pose imagery (e.g., off-pose and glasses) which differed from the frontal visible gallery imagery.

Additionally, using this dataset, both a VGG16-based and Resnet50-based example implementation was compared with other recent techniques such as pix2pix, GANVFS, DREAM, DAL-GAN, RST, Axial-GAN, and AP-GAN.

While the approach used for the RST and DREAM models are feature-based domain adaptation models, the others are based on Generative adversarial Networks (GANs). As a baseline, the results may be obtained from thermal-to-visible matching when using raw features extracted from the thermal probes and the visible gallery. These raw image representations are extracted across different conditions and protocols using a similar feature extraction network.

Tables II, III, and IV illustrate the thermal-to-visible face verification performance across different techniques on the ARL-VTF dataset respectively for pose, expression, and baseline conditions. Compared with the other state-of-the-art models shown in these tables, both example models (e.g., ResNet50-based and VGG16-based) perform better with higher AUC, TAR, and lower EER for baseline and pose conditions. While the RST technique performs better than the proposed VGG16-based framework on the probes P_TE0 in the expression case as shown in Table III, the proposed Resnet50-based framework still provides the best performance across the different probe sets for the expression condition. Additionally, as shown in FIGS. 6A, 6B, 7A, and 7B, the ROC curves across various techniques respectively for pose, expression and baseline conditions using gallery and probe sets from the ARL-VTF dataset. As demonstrated in FIGS. 6A, 6B, 7A, and 7B, example concepts provide the best AUC compared to other domain adaptation models. Especially with the pose conditions, the example Domain and Pose Invariant Framework presents the highest AUC compared to other models (e.g., frontalization and generative models) as shown on FIGS. 6A and 6B.

Figures 6A, 6B:
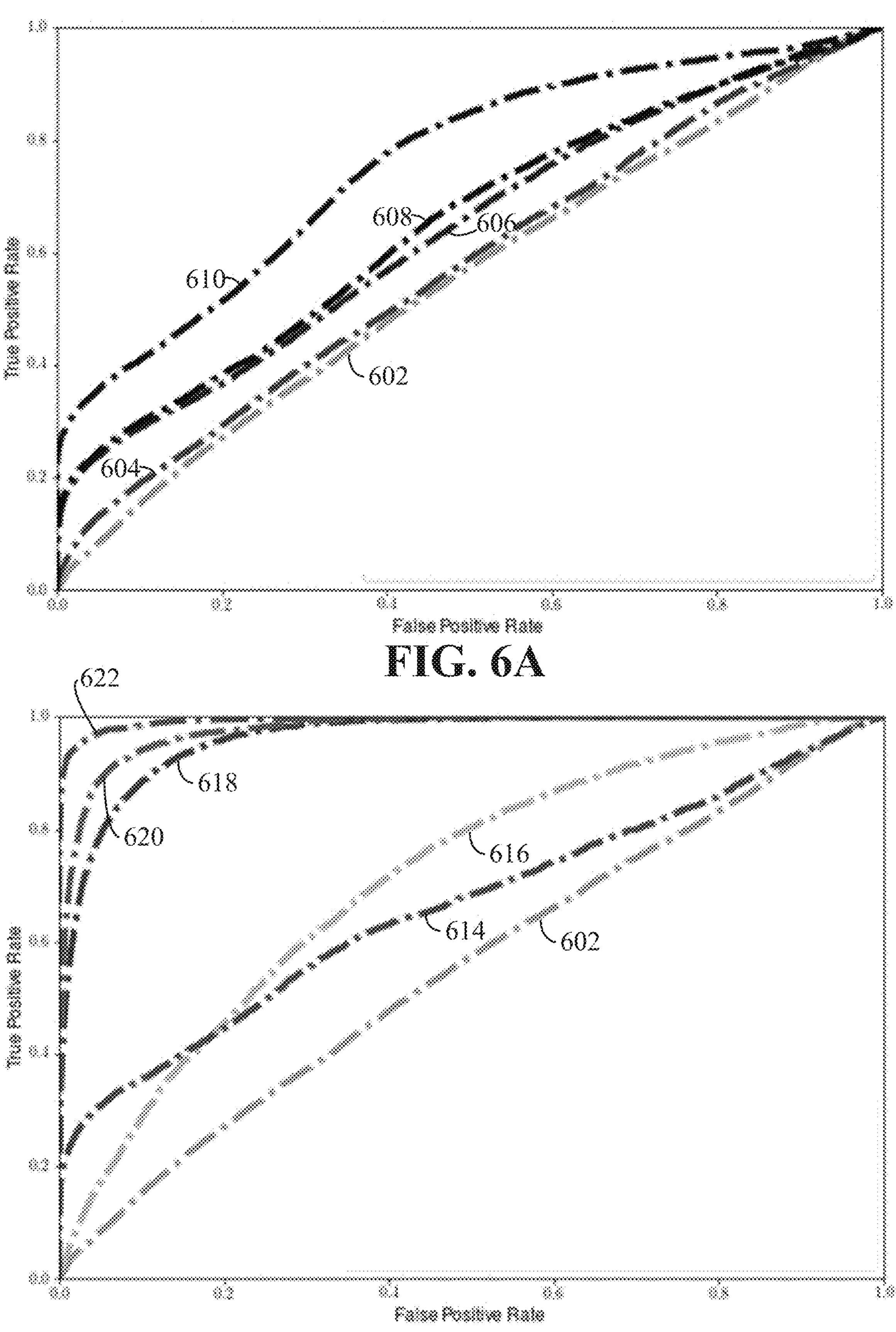
FIGS. 6A and 6B are graphs showing example receiver operating characteristic (ROC) curves for image synthesis in FIG. 6A and invariant image representation techniques in FIG. 6B according to some embodiments.

For example, FIGS. 6A and 6B illustrate ROC curves of the different techniques applied on P_TP0/G_VB0– using pose condition for image synthesis (FIG. 6A) and invariant image representation (FIG. 6B). The techniques include raw-pose (AUC=0.5525) 602, Pix2Pix-pose (AUC=0.5734) 604, GANVFS-pose (AUC=0.6370) 606, APGAN-pose (AUC=0.6506) 608, GAN-based GT(vis-to-vis)-pose (AUC=0.7577) 610, RST-pose (AUC=0.6626) 614, DREAM-pose (AUC=0.7124) 616, DPIT (with VGG16)-pose (AUC=0.9628) 618, DPIT (with Resnet50)-pose (AUC=0.9769) 620, and feature-based GT (vis-to-vis)-pose (AUC=0.9945) 622).

Figure 7A:
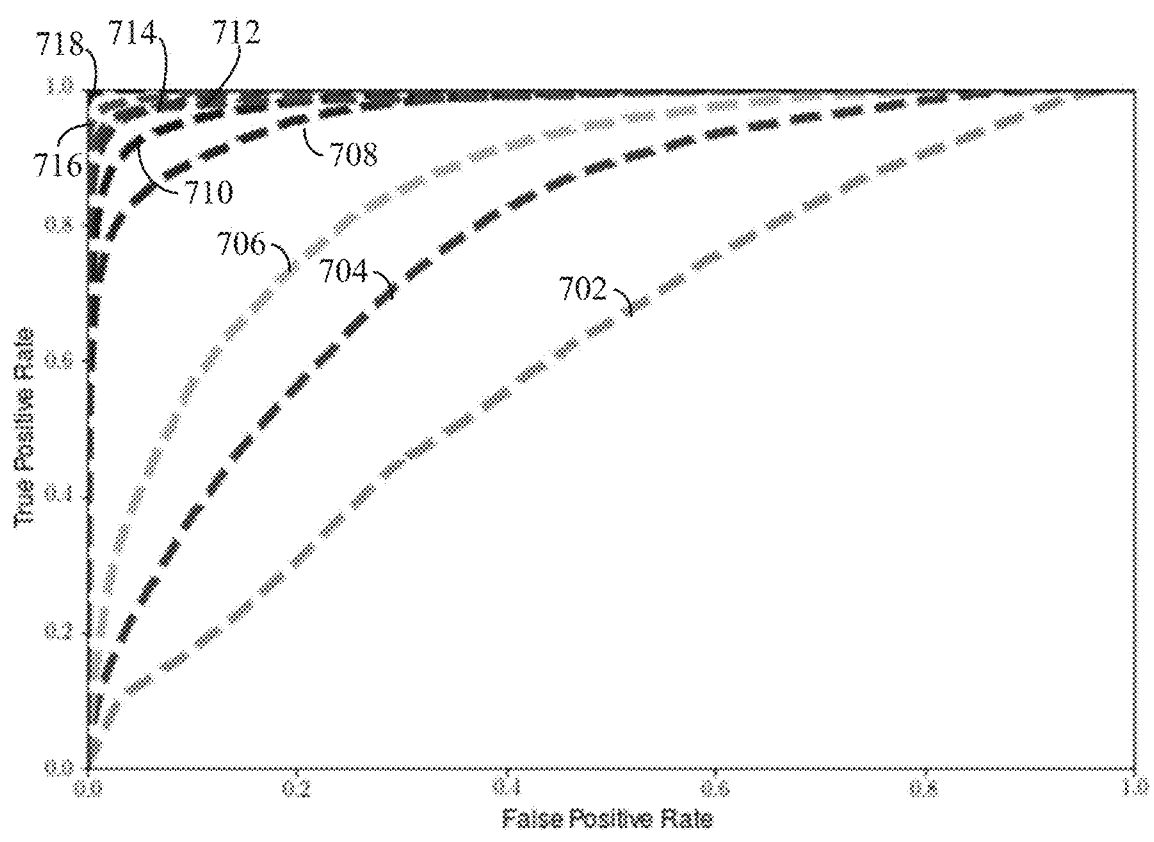
FIGS. 7A and 7B are graphs showing example receiver operating characteristic (ROC) curves of different techniques using expression condition in FIG. 7A and using baseline condition in FIG. 7B according to some embodiments.
Figure 7B:
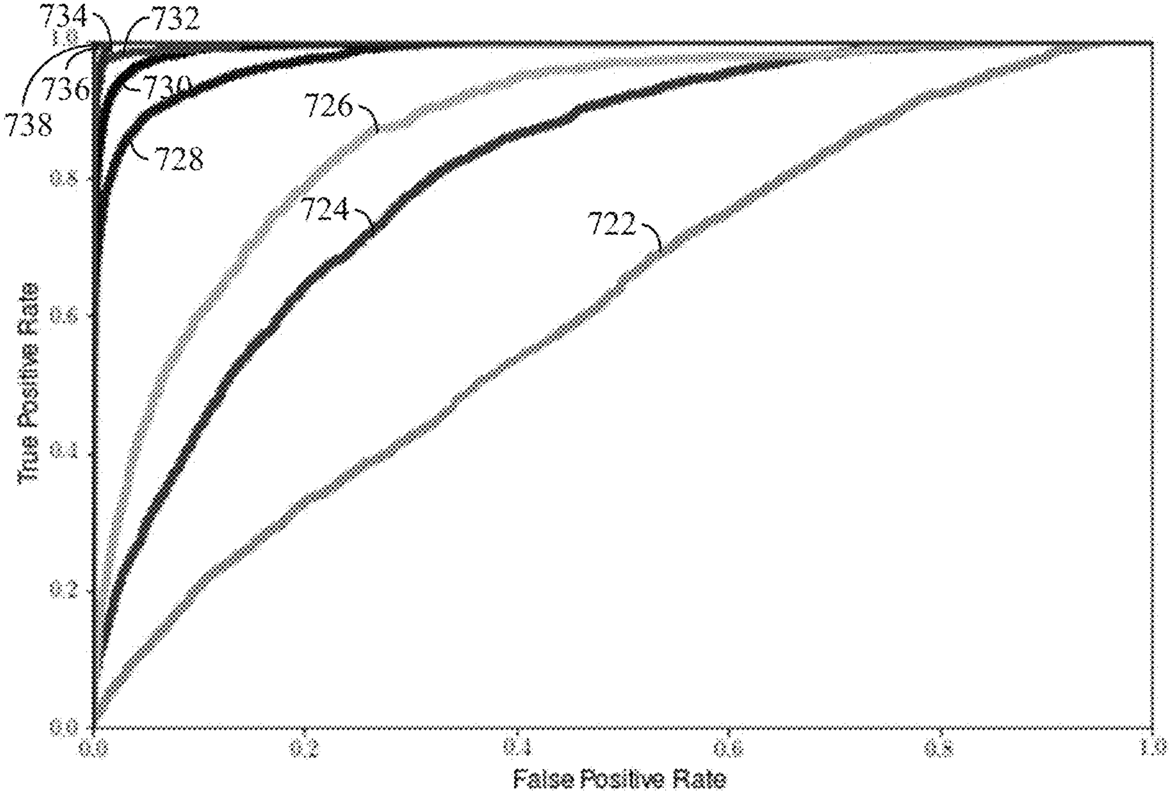

FIGS. 7A and 7B illustrate ROC curves of the different techniques applied on P_TP0/G_VB0—using expression condition (FIG. 7A) and baseline condition (FIG. 7B). The techniques using expression condition in FIG. 7A include raw-expression (AUC=0.6141) 702, Pix2Pix-expression (AUC=0.7798) 704, DREAM-expression (AUC=0.8598) 706, GANVFS-expression (AUC=0.9682) 708, APGAN-expression (AUC=0.9846) 710, RST-expression (AUC=0.9895) 712, DPIT (with VGG16)-expression (AUC=0.9939) 714, DPIT (with Resnet50)-expression (AUC=0.9979) 716, and GT(vis-to-vis)-baseline (AUC=0.9998) 718). The techniques using baseline condition in FIG. 7B include raw-baseline (AUC=0.6137) 722, Pix2Pix-baseline (AUC=0.8135) 724, DREAM-baseline (AUC=0.8768) 726, GANVFS-baseline (AUC=0.9794) 728, APGAN-baseline (AUC=0.9928) 730, RST-baseline (AUC=0.9976) 732, DPIT (with VGG16)-baseline (AUC=0.9989) 734, DPIT (with Resnet50)-baseline (AUC=0.9999) 736, and GT(vis-to-vis)-baseline (AUC=0.9999) 738).

TABLE II

Face verification results using pose condition from ARL-VTF Dataset

| Probes | Technique | AUC (%) | EER (%) | TAR@1% FAR | TAR@5% FAR |
|---|---|---|---|---|---|
| | | Gallery G VB0– | | | |
| P_TP0 | Raw | 55.24 | 46.25 | 2.23 | 8.25 |
| | Pix2Pix | 54.86 | 47.22 | 3.13 | 9.78 |
| | GANVFS | 63.70 | 41.66 | 16.55 | 23.73 |
| | AP-GAN | 65.06 | 40.24 | 17.33 | 24.56 |
| | RST | 66.26 | 38.05 | 22.18 | 30.72 |
| | DREAM | 71.24 | 34.60 | 4.36 | 17.07 |
| | DAL-GAN | 77.48 | 29.08 | 8.20 | 25.89 |
| | VGG16 + DPIT | 96.28 | 10.80 | 52.37 | 78.86 |
| | Resnet50 + DPIT | 97.69 | 7.75 | 66.08 | 88.74 |
| P_TP– | Raw | 55.48 | 45.98 | 3.25 | 8.47 |
| | Pix2Pix | 54.31 | 47.04 | 2.93 | 8.44 |
| | GANVES | 65.79 | 40.35 | 17.84 | 25.48 |
| | AP-GAN | 67.27 | 39.00 | 18.16 | 26.02 |
| | RST | 68.24 | 37.6 | 23.09 | 33.54 |
| | DREAM | 73.63 | 33.33 | 9.25 | 23.47 |
| | DAL-GAN | 82.18 | 25.11 | 10.82 | 30.64 |
| | VGG16 + DPIT | 96.46 | 10.33 | 56.68 | 79.93 |
| | Resnet50 + DPIT | 97.09 | 9.09 | 63.91 | 84.40 |
| | | Gallery G VB0+ | | | |
| P_TP0 | Raw | 55.10 | 46.34 | 2.91 | 8.74 |
| | Pix2Pix | 56.50 | 46.03 | 4.01 | 10.84 |
| | GANVFS | 65.58 | 40.19 | 17.95 | 25.68 |
| | AP-GAN | 67.13 | 38.67 | 18.91 | 26.46 |
| | RST | 68.39 | 36.86 | 22.64 | 31.81 |
| | DREAM | 75.87 | 31.2 | 6.46 | 21.43 |
| | DAL-GAN | — | — | — | — |
| | VGG16 + DPIT | 96.27 | 10.14 | 46.76 | 78.01 |
| | Resnet50 + DPIT | 97.39 | 8.39 | 68.00 | 88.54 |
| P_TP– | Raw | 56.82 | 44.74 | 2.09 | 7.57 |
| | Pix2Pix | 50.08 | 49.67 | 0.60 | 4.33 |
| | GANVFS | 59.51 | 44.04 | 4.29 | 15.47 |
| | AP-GAN | 60.10 | 43.57 | 5.77 | 15.97 |
| | RST | 63.29 | 41.79 | 18.79 | 27.93 |
| | DREAM | 62.93 | 41.47 | 2.53 | 8.93 |
| | DAL-GAN | — | — | — | — |
| | VGG16 + DPIT | 94.44 | 12.54 | 35.11 | 67.75 |
| | Resnet50 + DPIT | 96.62 | 10.39 | 55.84 | 78.73 |

TABLE III

Face verification results using expression condition from ARL-VTF Dataset

| Probes | Technique | AUC (%) | EER (%) | TAR@1% FAR | TAR@5% FAR |
|---|---|---|---|---|---|
| | | Gallery G VB0− | | | |
| P_TE0 | Raw | 61.40 | 41.96 | 3.40 | 12.18 |
| | Pix2Pix | 69.10 | 35.98 | 7.01 | 16.44 |
| | DREAM | 85.98 | 22.54 | 16.36 | 40.46 |
| | GANVFS | 96.81 | 10.51 | 70.41 | 84.00 |
| | AP-GAN | 98.46 | 6.44 | 81.11 | 92.49 |
| | RST | 98.95 | 3.61 | 92.61 | 96.88 |
| | VGG16 + DPIT | 99.39 | 4.01 | 89.89 | 96.46 |
| | Resnet50 + DPIT | 99.79 | 2.39 | 96.49 | 98.31 |
| P_TE− | Raw | 63.26 | 42.34 | 4.66 | 16.28 |
| | Pix2Pix | 68.78 | 36.24 | 7.75 | 18.06 |
| | DREAM | 87.01 | 22.06 | 21.06 | 41.07 |
| | Axial-GAN | 92.71 | 14.86 | — | — |
| | GANVFS | 98.66 | 5.93 | 73.17 | 92.82 |
| | AP-GAN | 99.30 | 3.84 | 82.55 | 97.44 |
| | RST | 99.83 | 2.27 | 95.66 | 99.48 |
| | VGG16 + DPIT | 99.90 | 1.72 | 97.19 | 99.80 |
| | Resnet50 + DPIT | 99.88 | 0.81 | 99.47 | 99.87 |
| | | Gallery G VB0+ | | | |
| P_TE0 | Raw | 62.50 | 41.38 | 4.60 | 13.25 |
| | Pix2Pix | 73.97 | 31.87 | 7.93 | 19.60 |
| | DREAM | 86.62 | 21.72 | 18.47 | 42.49 |
| | GANVFS | 97.73 | 8.90 | 74.20 | 86.80 |
| | AP-GAN | 98.89 | 5.60 | 84.23 | 93.94 |
| | RST | 99.01 | 3.57 | 92.69 | 96.93 |
| | VGG16 + DPIT | 99.58 | 3.19 | 93.03 | 98.09 |
| | Resnet50 + DPIT | 99.70 | 2.33 | 96.52 | 98.29 |
| P_TE− | Raw | 59.33 | 43.17 | 2.04 | 8.00 |
| | Pix2Pix | 51.05 | 49.11 | 2.26 | 4.95 |
| | DREAM | 72.42 | 35.07 | 8.60 | 21.13 |
| | Axial-GAN | 88.01 | 21.58 | — | — |
| | GANVFS | 83.68 | 22.41 | 6.77 | 22.13 |
| | AP-GAN | 86.12 | 21.68 | 9.88 | 31.62 |
| | RST | 99.48 | 3.05 | 89.45 | 98.07 |
| | VGG16 + DPIT | 99.37 | 3.81 | 89.66 | 96.39 |
| | Resnet50 + DPIT | 99.77 | 2.92 | 95.33 | 98.87 |

TABLE IV

Face verification results using baseline condition from ARL-VTF dataset

| Probes | Technique | AUC (%) | EER (%) | TAR@1% FAR | TAR@5% FAR |
|---|---|---|---|---|---|
| | | Gallery G_VB0− | | | |
| P_TB0 | Raw | 61.37 | 43.36 | 3.13 | 11.28 |
| | Pix2Pix | 71.12 | 33.80 | 6.95 | 21.28 |
| | DREAM | 87.68 | 20.58 | 18.56 | 44.36 |
| | GANVFS | 97.94 | 8.14 | 75.00 | 88.93 |
| | AP-GAN | 99.28 | 3.97 | 87.95 | 96.66 |
| | RST | 99.76 | 2.30 | 96.84 | 98.43 |
| | VGG16 + DPIT | 99.89 | 1.20 | 97.19 | 100.00 |
| | Resnet50 + DPIT | 99.99 | 0.15 | 100.00 | 100.00 |

TABLE IV-continued

Face verification results using baseline condition from ARL-VTF dataset

| Probes | Technique | AUC (%) | EER (%) | TAR@1% FAR | TAR@5% FAR |
|---|---|---|---|---|---|
| P_TB− | Raw | 61.14 | 41.64 | 2.77 | 16.11 |
| | Pix2Pix | 68.77 | 38.02 | 6.69 | 20.28 |
| | DREAM | 87.48 | 20.01 | 14.78 | 39.71 |
| | Axial-GAN | 94.40 | 12.38 | — | — |
| | GANVFS | 99.36 | 3.77 | 84.88 | 97.66 |
| | AP-GAN | 99.63 | 2.66 | 91.55 | 98.88 |
| | RST | 99.83 | 1.95 | 96.00 | 99.48 |
| | VGG16 + DPIT | 99.94 | 1.01 | 99.29 | 100.00 |
| | Resnet50 + DPIT | 100.00 | 0.00 | 100.00 | 100.00 |
| P_TB+ | Raw | 59.52 | 42.60 | 4.66 | 6.00 |
| | Pix2Pix | 59.68 | 41.72 | 3.33 | 3.33 |
| | DREAM | 74.63 | 29.97 | 3.84 | 23.05 |
| | Axial-GAN | 84.62 | 24.67 | — | — |
| | GANVFS | 87.61 | 20.16 | 20.55 | 44.66 |
| | AP-GAN | 91.11 | 17.43 | 22.33 | 55.66 |
| | RST | 99.28 | 5.32 | 89.21 | 94.79 |
| | VGG16 + DPIT | 99.61 | 3.40 | 92.46 | 98.81 |
| | Resnet50 + DPIT | 99.91 | 1.94 | 96.84 | 100.00 |
| | | Gallery G_VB0+ | | | |
| P_TB0 | Raw | 62.83 | 42.37 | 4.19 | 13.29 |
| | Pix2Pix | 75.22 | 30.42 | 8.28 | 27.63 |
| | DREAM | 89.21 | 18.82 | 21.15 | 45.61 |
| | GANVFS | 98.58 | 6.94 | 79.09 | 91.04 |
| | AP-GAN | 99.49 | 3.38 | 90.52 | 97.81 |
| | RST | 99.87 | 1.84 | 97.29 | 98.80 |
| | VGG16 + DPIT | 99.84 | 2.12 | 94.89 | 100.00 |
| | Resnet50 + DPIT | 100.00 | 0.12 | 100.00 | 100.00 |
| P_TB− | Raw | 57.61 | 44.73 | 1.38 | 6.11 |
| | Pix2Pix | 52.11 | 48.88 | 2.22 | 4.66 |
| | DREAM | 74.39 | 32.02 | 4.23 | 20.92 |
| | Axial-GAN | 89.71 | 19.75 | — | — |
| | GANVFS | 87.34 | 18.66 | 7.00 | 29.66 |
| | AP-GAN | 89.24 | 19.49 | 16.33 | 41.22 |
| | RST | 99.03 | 4.79 | 85.56 | 95.86 |
| | VGG16 + DPIT | 99.82 | 1.60 | 95.10 | 100.00 |
| | Resnet50 + DPIT | 97.97 | 0.66 | 100.00 | 100.00 |
| P_TB+ | Raw | 78.26 | 29.77 | 3.88 | 21.33 |
| | Pix2Pix | 67.08 | 36.44 | 2.68 | 11.11 |
| | DREAM | 75.49 | 32.28 | 8.85 | 29.72 |
| | Axial-GAN | 93.62 | 14.05 | — | — |
| | GANVFS | 96.82 | 8.66 | 46.77 | 83.00 |
| | AP-GAN | 97.96 | 7.21 | 60.11 | 88.7 |
| | RST | 99.97 | 0.73 | 99.47 | 100.00 |
| | VGG16 + DPIT | 99.95 | 0.70 | 100.00 | 100.00 |
| | Resnet50 + DPIT | 100.00 | 0.32 | 100.00 | 100.00 |

B. Results on the ARL-MMF Dataset

Table V shows the face verification performance of the example concepts described herein and other recent techniques matching off-pose thermal probes with frontal visible gallery using volume III of the ARL-MMF dataset. In some examples, the example Resnet50-based model can be fine-tuned using the pretrained weights from the ARL-VTF dataset training, and the mean performance is reported along with the standard deviation across all training protocols. The results presented in Table V demonstrate an advantage of example techniques over the others as it offers the best performance. In some aspects of the disclosure, this dataset is a more challenging dataset compare to the ARL-VTF dataset as it is about 100× smaller and includes images collected a longer range with a variable illumination. This explains the drop in performance observed when evaluating the example technique domain adaptation framework on the ARL-MMF dataset Volume III comparing to ARL-VTF performance. However, compared to currently available techniques, the example concepts described herein still achieves improvements of 17.7% and 24.99 for TAR@1% FAR and TAR@5% FAR, respectively.

TABLE V

Face verification results on the ARL-MMF Dataset

| Conditions | Techniques | AUC (%) | EER (%) | TAR @1% FAR (%) | TAR @5% FAR (%) |
|---|---|---|---|---|---|
| Pose | Raw | 64.12 | 40.51 | 4.21 | 17.74 |
| | Pix2pix | 73.60 | 31.96 | 11.16 | 26.45 |
| | TP-GAN | 76.15 | 30.89 | 6.26 | 19.03 |
| | PIM | 80.89 | 26.86 | 9.83 | 27.11 |
| | DA-GAN | 86.26 | 21.56 | 14.74 | 33.17 |
| | DAL-GAN | 88.61 | 20.21 | 16.07 | 40.93 |
| | DPIT | 93.06 ± 0.42 | 14.97 ± 0.44 | 33.77 ± 4.94 | 64.92 ± 2.08 |

C. Results on the Tufts Face Dataset

Table VI shows cross-spectrum face verification performance of several techniques including the example concepts described herein on the Tufts dataset using for the pose condition. Similar to the ARL-MMF dataset, the proposed Resnet50-based network is fine-tuned using the same pre-trained weights from the ARL-VTF dataset training, and the mean performance is reported along with the standard deviation across all training protocols. With this other challenging dataset, example techniques described herein surpass the competing ones by improving state-of-the-art performance by 11.15%, 10.88% and 12.44% in AUC, EER, and TAR@1% FAR, respectively. Relatively lower performance is obtained with the Tufts dataset compared to the ARL-VTF dataset as this dataset was collected with older thermal cameras that had lower resolution (i.e., 336×256 for Tufts compared to 640×512 for ARL-VTF) and lower sensitivity. This, along with the relative small size of the Tufts dataset do not provide as much learnable information during training as the ARL-VTF dataset.

TABLE V

Face verification results on the Tufts Face Dataset

| Conditions | Techniques | AUC (%) | EER (%) | TAR @1% FAR (%) | TAR @5% FAR (%) |
|---|---|---|---|---|---|
| Pose | Raw | 67.55 | 37.88 | 5.11 | 16.11 |
| | Pix2pix | 69.71 | 35.31 | 5.44 | 21.66 |
| | TP-GAN | 70.93 | 35.32 | 6.46 | 18.77 |
| | PIM | 72.84 | 34.1 | 8.77 | 21 |
| | DA-GAN | 75.24 | 31.14 | 10.44 | 26.22 |
| | DAL-GAN | 78.68 | 28.38 | 10.44 | 27.11 |
| | DPIT | 91.82 ± 0.35 | 16.03 ± 0.53 | 31.59 ± 2.64 | 58.75 ± 1.83 |

D. Ablation Study

Embedding Size: Table VII shows the impact of the feature vector length on profile-to-frontal cross-spectrum FR. As shown in the table, the example concepts described herein are more discriminative with a larger feature vector until performance saturates between 256- and 512-dimensional representations. However, peak performance is obtained at the cost of a relatively large number of trainable parameters which increases computation complexity, memory requirements, and vulnerability to over-fitting. In fact, it can be seen that as the image representations vector doubles in size the number of trainable parameters increases by a factor of about 1.8. The example techniques described herein uses 256 as the embedding size since larger feature vectors did not provide a significant improvement and the number of trainable parameters almost doubles and quadruples respectively for an embedding size of 512 and 1024, respectively. However, any suitable embedding size can be used.

TABLE VII

Ablation Study on Embedding Size

| Embedding Size | Trainable Parameters | AUC (%) | EER (%) | TAR@1% FAR (%) | TAR@5% FAR (%) |
|---|---|---|---|---|---|
| 64 | 4.5M | 94.92 | 12.69 | 45.63 | 73.89 |
| 128 | 7.7M | 96.58 | 10.2 | 54.27 | 82.6 |
| 256 | 14.1M | 97.69 | 7.75 | 66.08 | 88.74 |
| 512 | 26.9M | 97.68 | 7.83 | 67.54 | 88.29 |
| 1024 | 52.6M | 97.51 | 8.18 | 66.82 | 87.72 |

Figure 8:
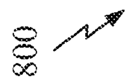
FIG. 8 is a graph showing an example ablation study on loss parameter according to some embodiments.
Figure 8:
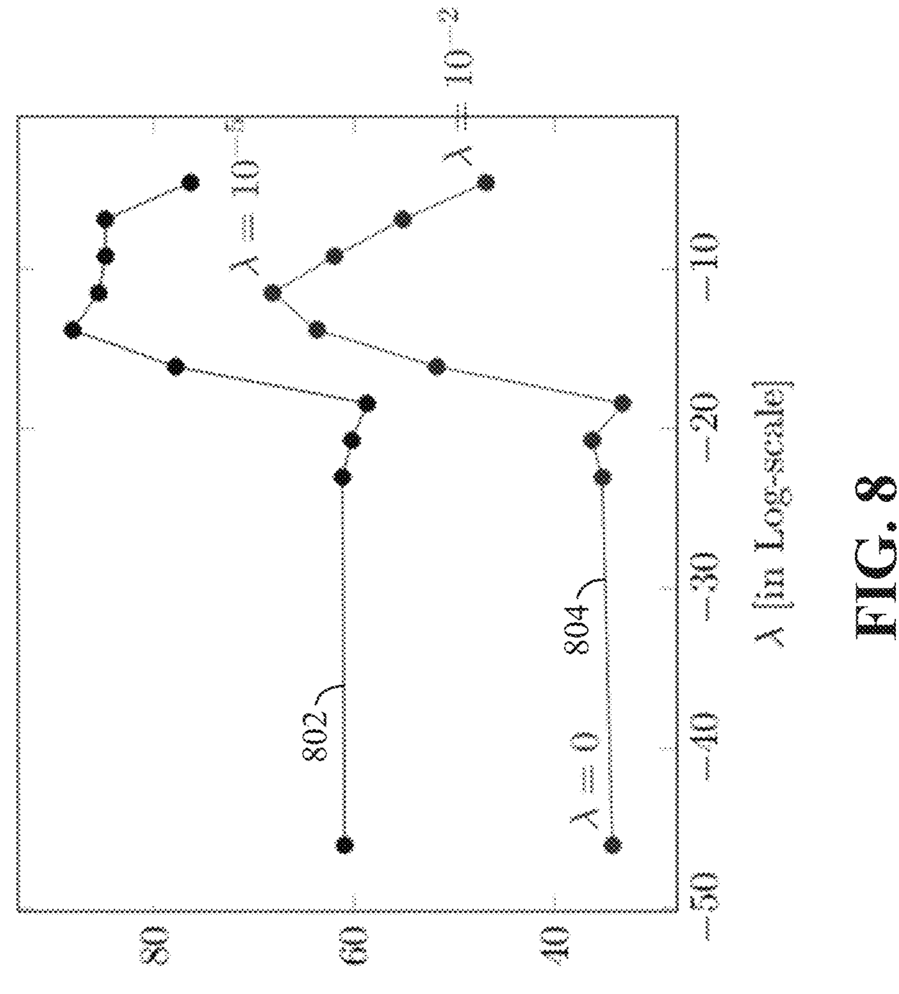

Loss Parameter: FIG. 8 illustrates an ablation study on loss parameter (embedding size is 256) based on Table VIII. FIG. 8 shows how the loss parameter λ effects True Acceptance Rate (TAR) performances. The inventors observed the highest TAR performance when $\lambda=10^{-5}$ and when $\lambda=10^{-6}$ at TAR@1% FAR 702 and TAR@5% FAR 704. As described in the Section 2(E), $\lambda=10^{-5}$ can be used as the example loss parameter since it yields highest TAR@1% FAR and thus provides minimal false positives during face verification. When λ=0 (i.e., no pose-correction loss), the joint loss function described in Equation 10 simply becomes the cross-spectrum loss. In a such situation, 34.24% and 60.94% can be obtained for TAR@1% FAR and TAR@5% FAR, respectively, which is significantly lower compared to the peak performance as shown in FIG. 8. This suggests that training the concepts described herein using only the proposed cross-spectrum loss may not be sufficient to bridge pose and domain gaps. This demonstrates effectiveness of the proposed joint-loss function in learning robustness to pose and domain variations. Although the concepts described herein trained solely with proposed cross-spectrum loss provide lower performance, it still achieves around 12.06% and 30.22% improvements in TAR at 1% FAR and 5% FAR respectively.

TABLE VIII

Loss Parameter λ

| λ | AUC (%) | EER (%) | TAR@1% FAR (%) | TAR@5% FAR (%) |
|---|---|---|---|---|
| 0 | 88.43 | 18.4 | 34.24 | 60.94 |
| $10^{-10}$ | 89.64 | 16.43 | 35.25 | 61.17 |
| $10^{-9}$ | 89.27 | 17.26 | 36.27 | 60.23 |
| $10^{-8}$ | 90.09 | 17.63 | 33.25 | 58.69 |
| $10^{-7}$ | 95.56 | 11.57 | 51.78 | 77.8 |
| $10^{-6}$ | 97.38 | 8.12 | 63.69 | 88.06 |

TABLE VIII-continued

| Loss Parameter λ | | | | |
|---|---|---|---|---|
| λ | AUC (%) | EER (%) | TAR@1% FAR (%) | TAR@5% FAR (%) |
| $10^{-5}$ | 97.41 | 8.26 | 68.13 | 85.47 |
| $10^{-4}$ | 97.13 | 9.08 | 61.94 | 84.8 |
| $10^{-3}$ | 96.74 | 9.26 | 55.14 | 84.81 |
| $10^{-2}$ | 95.19 | 12.12 | 46.83 | 76.34 |

Modified Base Architecture Output Feature Maps: As illustrated in Table I, both base architectures are composed of five main convolutional blocks. We herein study the effect of truncating each base architecture at various depths on off-pose to frontal cross-spectrum matching performance. Table VIII presents for each base architecture, feature map dimensions at different blocks with the corresponding Equal Error Rate (EER), and True Accept Rate at 1% when matching thermal off-pose face imagery with visible frontal face imagery from ARL-VTF dataset. These results were obtained by matching off-pose thermal and frontal visible image embeddings using cosine similarity.

The results shown in this table suggest that better thermal off-pose to visible frontal matching is achieved when truncating base architectures right after 'block4_pool' and 'block4_e' for VGG16 and Resnet50, respectively. This indicates that although early intermediate layers (i.e., 'block3_pool' and 'block_3d') provide enough similarity between frontal thermal and frontal visible image representations, the pose gap remains significant when matching thermal off-pose to visible frontal face imagery. Interestingly, deeper intermediate layers (i.e., 'block4_pool' and 'block4_e') not only provide images representations that are less dependent on pose and spectrum, but they also offer sufficient contextual information for matching thermal off-pose probes to visible frontal gallery.

Flow Chart

Figure 9:
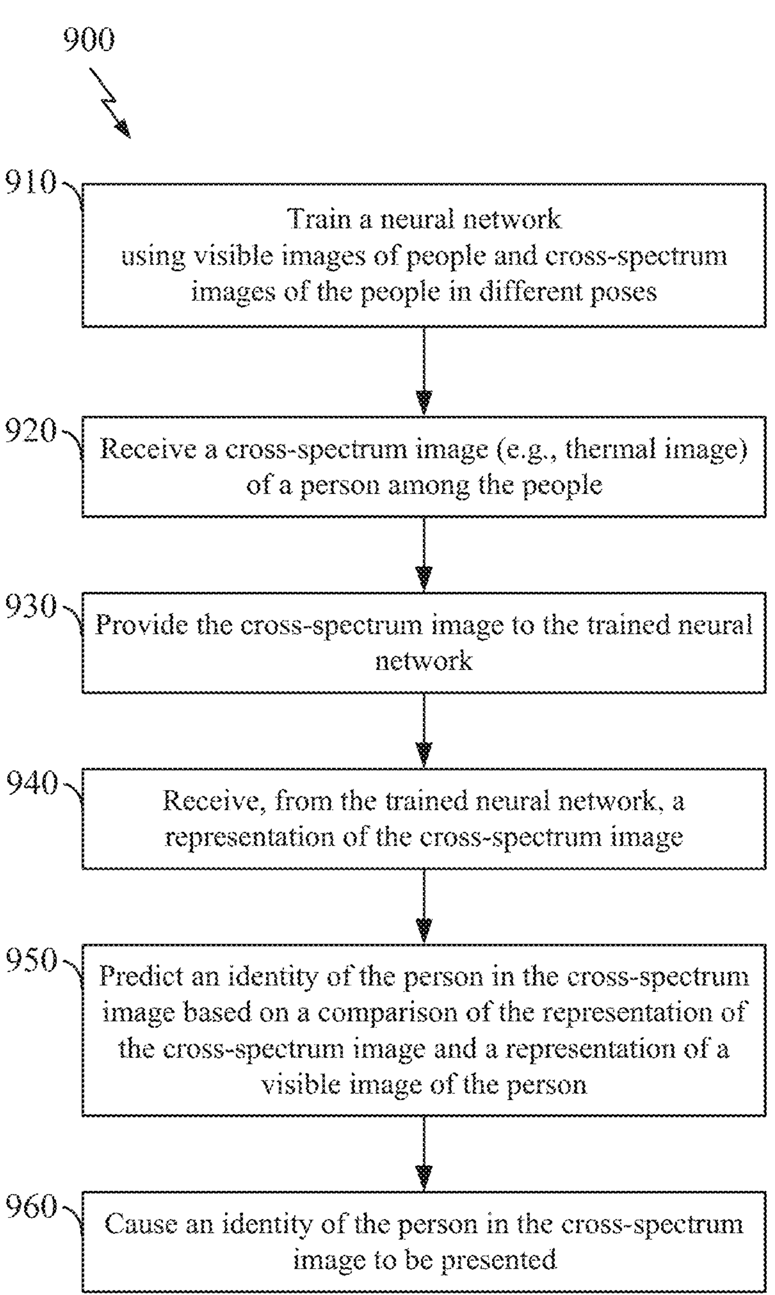
FIG. 9 is a flow chart illustrating an example process for cross-spectrum image classification using a neural network structure according to some embodiments.

FIG. 9 is a flow chart illustrating an example process 900 for cross-spectrum face recognition in accordance with some aspects of the present disclosure. As described below, a particular implementation can omit some or all illustrated features and may not require some illustrated features to implement all embodiments. In some examples, any suitable apparatus or means for carrying out the functions or algorithm described below may carry out the process 900. The process 900 is generally directed to a run-time stage using a trained neural network.

In block 910, an apparatus may train a neural network using visible spectrum training images of people and cross-spectrum training images of the same people in different poses. In some examples, a visible image may include an image with visible spectrum. Thus, the visible image shows a color image similar to what the human eye perceives. In addition, the visible image may be a frontal facial image. In further example, a cross-spectrum image may include a facial image using one or more different spectral bands from those in the visible images. For example, the cross-spectrum image may include a thermal image, a near-infrared (NIR) image, infrared image, or any other suitable image using different spectral bands from the visible image. In addition, the cross-spectrum image may include an off-pose facial image. For example, the off-pose facial image may include a non-frontal facial image, a facial image with varying expressions, a facial image with glasses, and/or any other suitable image other than frontal facial image without any expressions or any objects on the face. However, it should be appreciated that an off-pose facial image can include a frontal facial image or a non-frontal facial image. In other examples, the apparatus may train the neural network using front-facing visible spectrum training images of people and off-pose visible spectrum training images of the same people.

In further examples, the neural network may include a modified base architecture configured to extract image representations, a shared compression layer, and/or a domain adaptation sub-network to simultaneously learn pose and domain invariance using a joint loss function. In some examples, the modified base architecture may use the modified VGA16, the modified ResNet 50, or any other suitable modified deep learning architecture to generate a representation of a face for facial recognition. In further examples, the neural network can be trained using process 1000 described below in connection with FIG. 10.

In block 920, the apparatus may receive a cross-spectrum image (e.g., thermal image) of a person among the people in the visible and cross-spectrum training images. In some examples, the cross-spectrum image may include a frontal or off-pose face with or without any objects (e.g., glasses) on the face. In other examples, the apparatus may receive a visible off-pose image of a person among the people in the visible front-facing training images. In further examples, the apparatus may be the same as or may be different from the apparatus of block 910.

In block 930, the apparatus may provide the cross-spectrum image to the trained neural network. In some examples, the trained neural network may be in the same apparatus. However, the trained neural network is not limited to being in the apparatus. For example, the trained neural network may be in a separate apparatus (e.g., a separate server, a cloud server, etc.). The separate apparatus may be communicatively coupled with the apparatus (e.g., via a cable, a communication network, and/or a telecommunications link).

In block 940, the apparatus may receive, from the trained neural network, a representation of the cross-spectrum image. The representation of the cross-spectrum image may be a tensor (e.g., a matrix output by a grouped convolution layer (e.g., as described above in connection with FIG. 3)) that represents facial features of a subject in the cross-spectrum image received at block 920 in an embedding space.

In block 950, the apparatus may predict an identity of the person in the cross-spectrum image based on a comparison of the representation of the cross-spectrum image and a representation of a representation of a visible image of the person (e.g., which can be generated and stored in memory prior to execution of the process 900). In some examples, the apparatus may use cosine similarity to match embeddings of the off-pose cross-spectrum image with embeddings of the frontal visible image of the person. The identity of the person may include the name and/or any other suitable identifying information.

In block 960, the apparatus may cause an identity of the person in the cross-spectrum image to be presented. In some examples, the identity may be shown as the visible image of the person. In other examples, the identify may be shown as a percentage to be matched with the visible image of the person.

Figure 10:
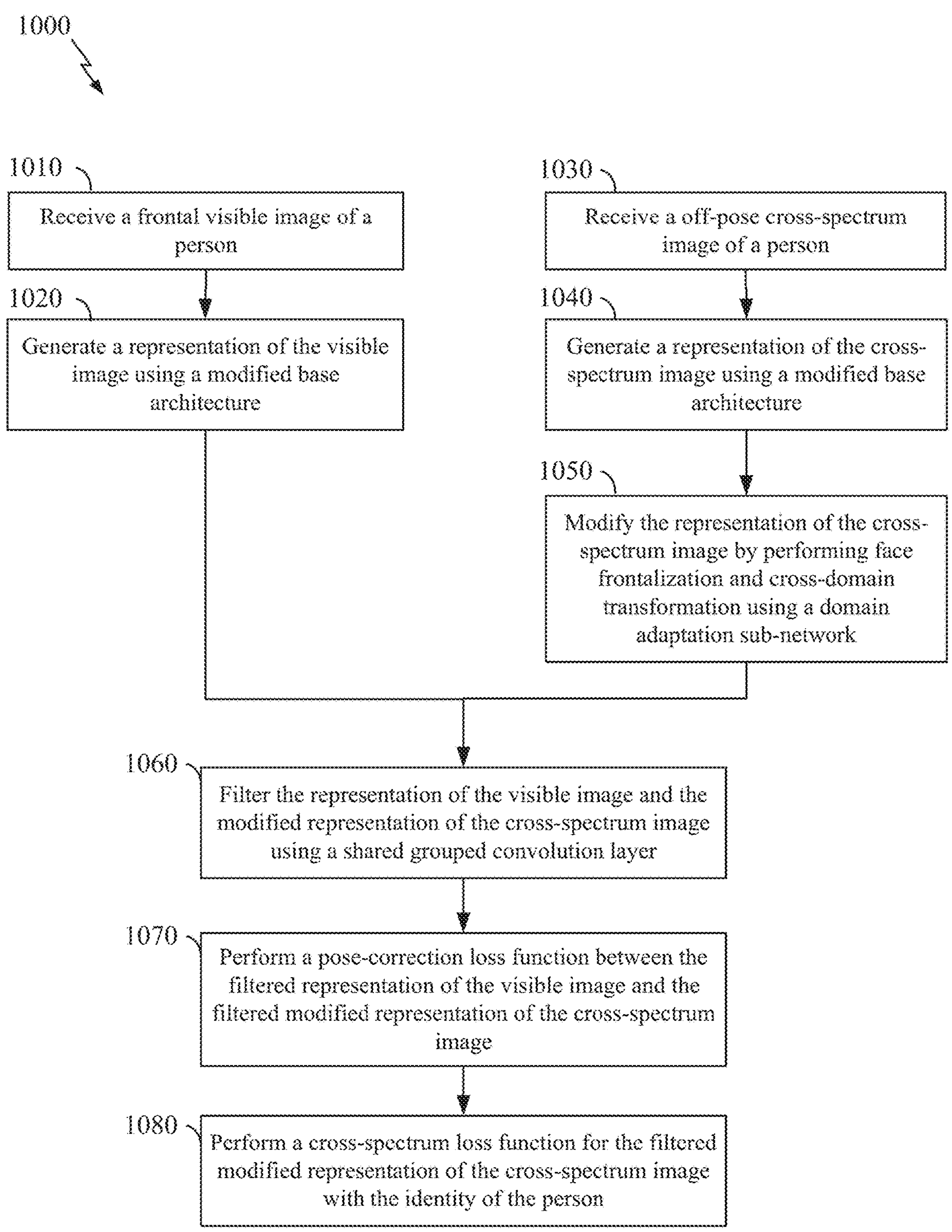
FIG. 10 is a flow chart illustrating an example process for neural network training according to some embodiments.

FIG. 10 is a flow chart illustrating an example process 1000 to train a neural network (i.e., example concepts described herein) for cross-spectrum face recognition in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 1000. The process 1000 is generally directed to a run-time stage using a trained neural network. In some examples, the process 1000 may be part of block 910 of FIG. 9.

In block 1010, the apparatus may receive a frontal visible image of a person.

In block 1020, the apparatus may generate a representation of the frontal visible image using a modified base architecture (e.g., the modified VGA16, the modified ResNet 50, or any other suitable modified deep learning architecture to generate a representation of a face for facial recognition) of the neural network. For example, the modified architecture may extract a discriminative image representation from the visible image. In some example, the representation of the frontal visible image may pass through a shared compress layer. The compression layer may be a single 1×1 convolutional layer to reduce the effect of the noise propagation and reduce the number of learnable parameters by compressing the base architecture feature maps. In some examples, the apparatus may make the trained representation not trainable and train an off-pose cross-spectrum image of the person. However, it should be appreciated that the apparatus may simultaneously train the off-pose cross-spectrum image of the person.

In block 1030, the apparatus may receive the off-pose cross-spectrum image of the person.

In block 1040, the apparatus may generate a representation of the cross-spectrum image using the modified base architecture of the neural network. For example, the modified architecture may extract a discriminative image representation from the cross-spectrum image. For example, the representation may indicate a feature map (i.e., $x_m$) of the cross-spectrum image x. In some examples, the modified base architecture may indicate a truncated neural network architecture by maximizing a receptive field of the truncated neural network architecture, and the extracted visible and thermal image representations are most similar. In some examples, maximizing receptive field can indicate providing the largest local spatial context (or coverage) in terms of pixels (or physical area). Thus, the modified base architecture may reduce domain-dependent features (e.g., skin color or texture) that are absent from thermal face images. For example, the truncated neural network architecture may include a truncated visual geometry group with 16 layers (VGG16) and a truncated deep residual network with 50 layers (ResNet50) to extract common features to match cross-spectrum off-pose imagery with corresponding frontal visible imagery. In some aspects of the disclosure, the truncated VGG16 may include the fourth convolutional-pooling block (i.e., 'block4_pool'), and the truncated ResNet50 may include the fifth convolutional group from the fourth residual block (i.e., 'block_4e'). In some examples, the truncated models include all blocks up to and including the specified blocks. For example, the truncated VGG16 can include all layers up to and including block4_pool while the truncated ResNet50 can include all layers up to and including the fifth convolutional group from the fourth residual block (i.e., 'block_4e'). In some examples, the representation of the off-pose cross-spectrum image may pass through the shared compress layer. The compression layer may be applied to both of the frontal visible image and the off-pose cross-spectrum image.

In block 1050, the apparatus may modify the representation of the off-pose cross-spectrum image using a domain adaptation sub-network, which can be trained to transform the representation of cross-spectrum images (e.g., of any pose, such as an off-front pose) into a representation that is comparable to a representation of a frontal visible spectrum image generated by the base architecture. In some examples, the representation of the off-pose cross-spectrum image may be a compressed representation (i.e., $h(x_m)$) by the shared compression layer.

In some examples, the domain adaptation sub-network (i.e., the example domain and pose invariance transform (DPIT)) may include a CNN-based sub-network to map the disparate representation to a common latent embedding subspace. For example, the domain adaptation sub-network may preserve identity information of in people in cross-spectrum images while effectively performing face frontalization in the embedding space and cross-domain transformation using face embeddings. In some examples, the domain adaptation sub-network may include two consecutive residual blocks, each block using 1×1 convolutional layers to map the cross-spectrum image representation to the visible image representation. In a non-limiting example, the first residual block of the domain adaptation sub-network may use Tanh activation function. Here, the input of the first residual block may include the cross-spectrum (e.g., thermal) representation, which is the output ($h(x_m)$) from the compression layer. The first residual block may include three 1×1 convolution layers. The input of the second residual block may include the cross-spectrum representations without passing through the first residual block (i.e., $h(x_m)$) and the convoluted cross-spectrum representations with passing through the first residual block (i.e., $Convc \circ Conv200 \circ Conv200\ (h(x_m))$). In the non-limiting example, the second residual block of the domain adaptation sub-network may use ReLu activation function. The second residual block may include two 1×1 convolution layers. Here, the output of the domain adaptation sub-network may include the input of the second residual block without passing through the second residual block (i.e., $F(x_m)$) and the convoluted input of the second residual block with passing through the second residual block (i.e., $Conv_c \circ Conv_c\ (F(x_m))$). The output of the domain adaptation sub-network may be a predicted visible representation or a transformed feature representation of the cross-spectrum image. The predicted visible representation may indicate a frontalized and visible-like image representation of the off-pose cross-spectrum image.

In block 1060, the apparatus may filter the representation of the visible image and the modified representation or the predicted visible representation of the cross-spectrum image using a shared grouped convolution layer. For example, the shared group convolution layer can filter the DPIT output (thermal-to-visible) representation and/or filter the visible representation in the same manner. In some embodiments, the group convolution part can reduce the number of parameters. In other embodiments, the shared grouped convolution layer can be a shared compression. The grouped convolution layer may use multiple filter groups to reduce number parameters by a factor related to the number of filter groups and to learn complementary filter groups. Here, since the modified representation is a frontalized and visible-like image representation, both representations of the visible image and the modified representation may use the shared grouped convolution layer.

In block 1070, the apparatus may calculate a pose-correction loss function between the filtered representation of the visible image and the filtered modified representation of the cross-spectrum image. For example, the pose-correction loss function may be used to push both representations of the visible image and the cross-spectrum image close to each other by minimizing the difference between them.

In block 1080, the apparatus may perform a cross-spectrum loss function for the filtered modified representation of the cross-spectrum image with the identity of the person. For example, the cross-spectrum loss function may ensure that the identity of the person is preserved during training by simultaneously learning discriminative features in the cross-spectrum. Thus, the cross-spectrum loss can optimize and enhance the domain adaptation sub-network.

In some examples, the apparatus may use a joint-loss function by combining the cross-spectrum loss function and the pose-correction loss function with a weight (λ). Thus, the joint-loss function may be a weighted sum of the cross-spectrum loss function and the pose-correction loss function. In a non-limiting example, the weight (λ) may be $10^{-5}$ to have the optimal trade-off between the model performance and the required number of trainable parameters. In further examples, the apparatus may update parameters in the neural network based on the cross-spectrum loss, the pose-correction loss, and/or joint-loss calculated in blocks 1070 and/or 1080. Further, the apparatus may iterate the process in blocks 1010-1080 to train the neural network.

Hardware Configuration Example

Figure 11:
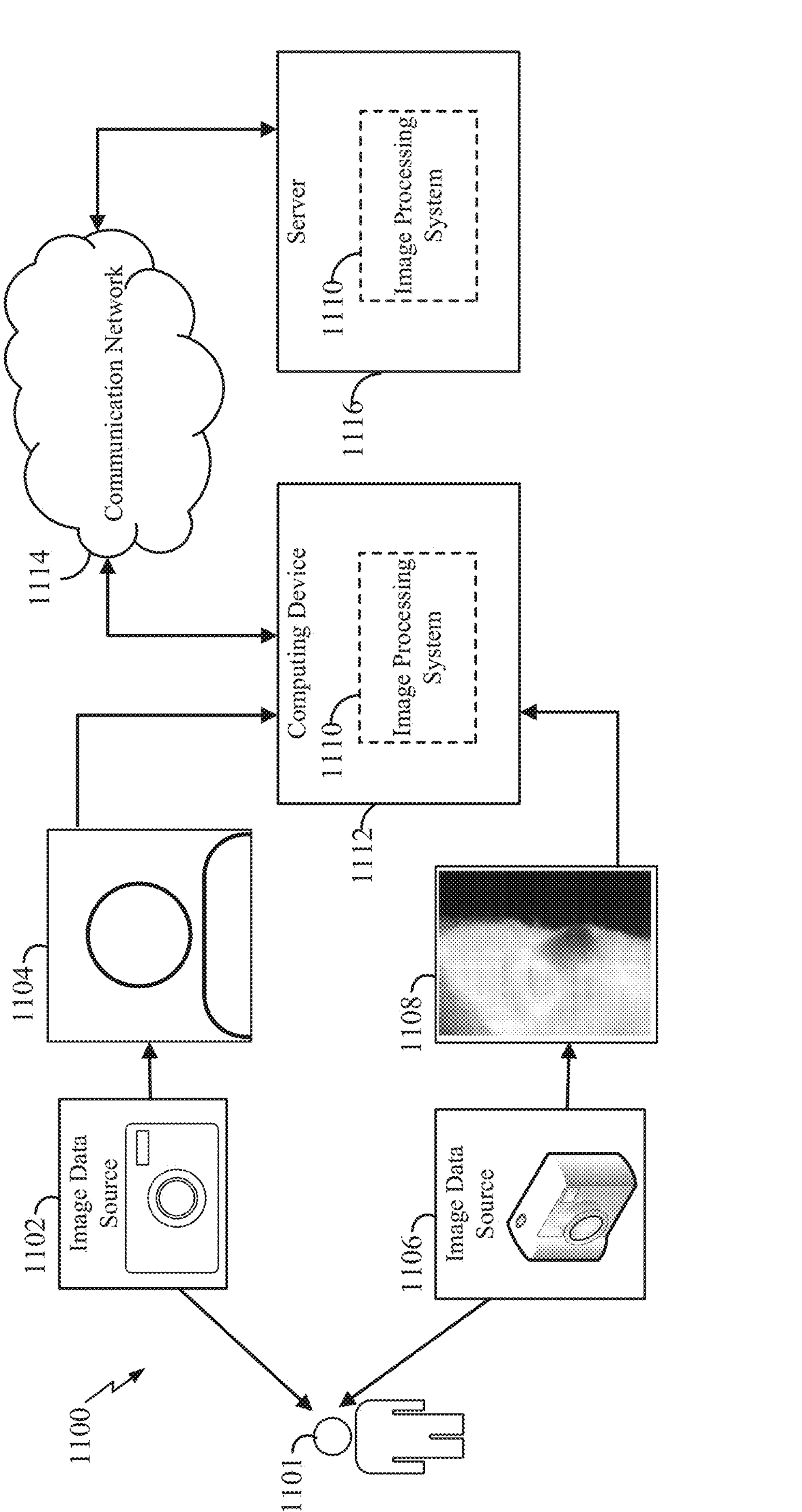
FIG. 11 is a block diagram conceptually illustrating a cross-spectrum imaging training and detection system according to some embodiments.

FIG. 11 is a block diagram conceptually illustrating a cross-spectrum imaging training and detection system 1100 with some embodiments of the disclosed subject matter. A computing device 1112 can receive image data from image data sources 1102, 1106. A first image data source 1102 may provide a stream of frontal visual images 1104 of subjects 1101 to the computing device 1112 while a second image data source 1106 may provide a stream of cross-spectrum images (e.g., off-pose or frontal images) of the subjects 1101. In some embodiments, the computing device 1112 can execute at least a portion of an image processing system 1110 to perform an image processing task, such as generating a high bit depth image from low bit depth images using a neural network, training a neural network to generate high bit depth image from low bit depth images, arranging the center of eyes, the nose, and corners of a mouth of the person to be disposed at a center of each of the visible images and the cross-spectrum images, resizing each of the visible images and the cross-spectrum images to a predetermined size, etc. In some examples, the computing device 1112 may include the neural network (e.g, domain and pose invariance framework) to be trained and/or to provide a representation of a cross-spectrum image. In other examples, the computing device 1112 may transmit the input image data to a server 1110 via a communication network 1114. Then, the server 1116 may execute at least a portion of the image processing system 1110 including the neural network. The server 1116 may train the neural network and return information to the computing device 1112 (and/or other suitable computing device) indicative of an output of an image processing task performed by the image processing system 1110. However, the trained neural network is not limited to being in the computing device 1112 or the server. For example, the trained neural network may be in a separate apparatus (e.g., a separate server, a cloud server, etc.). The image processing system 1110 may execute one or more portions of processes 900 and 1000.

In some examples, the image data source 1102, 1106 may be implemented using one or more visible image cameras and/or thermal image cameras that generate and/or output image data. In other examples, the image data source may include the training visible and cross-spectrum images 1104, 1108 from an existing dataset (e.g., the ARL-VTF dataset, the ARL-MMF dataset, and the Tufts Face database). Thus, in the examples, the image processing system 1110 may not need to receive training images 1104, 1108 from a physical imaging device (e.g., a visible or thermal camera). In some examples, image source 1106 may include, and/or be associated with, a light source that can be used to illuminate a subject 1101, such as an infrared light source, an NIR light source, etc.

In some embodiments, the communication network 1114 can be any suitable communication network or combination of communication networks. For example, the communication network 1114 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, the communication network 1114 can be a local area network, a wide area network, a public network (e.g., the Internet), a private or semi-private network (e.g., a corporate or university intranet), any other suitable type of network, or any suitable combination of networks. Communications links shown in FIG. 11 can each be any suitable communications link or combination of communications links, such as wired links, fiber optic links, Wi-Fi links, Bluetooth links, cellular links, etc.

In some embodiments, the computing device 1112 and/or the server 1116 can be any suitable computing device or combination of devices, such as a desktop computer, a laptop computer, a smartphone, a tablet computer, a wearable computer, a server computer, a computing device integrated into a vehicle (e.g., an autonomous vehicle), a camera, a robot, a virtual machine being executed by a physical computing device, etc.

Hardware Configuration Example

Figure 12:
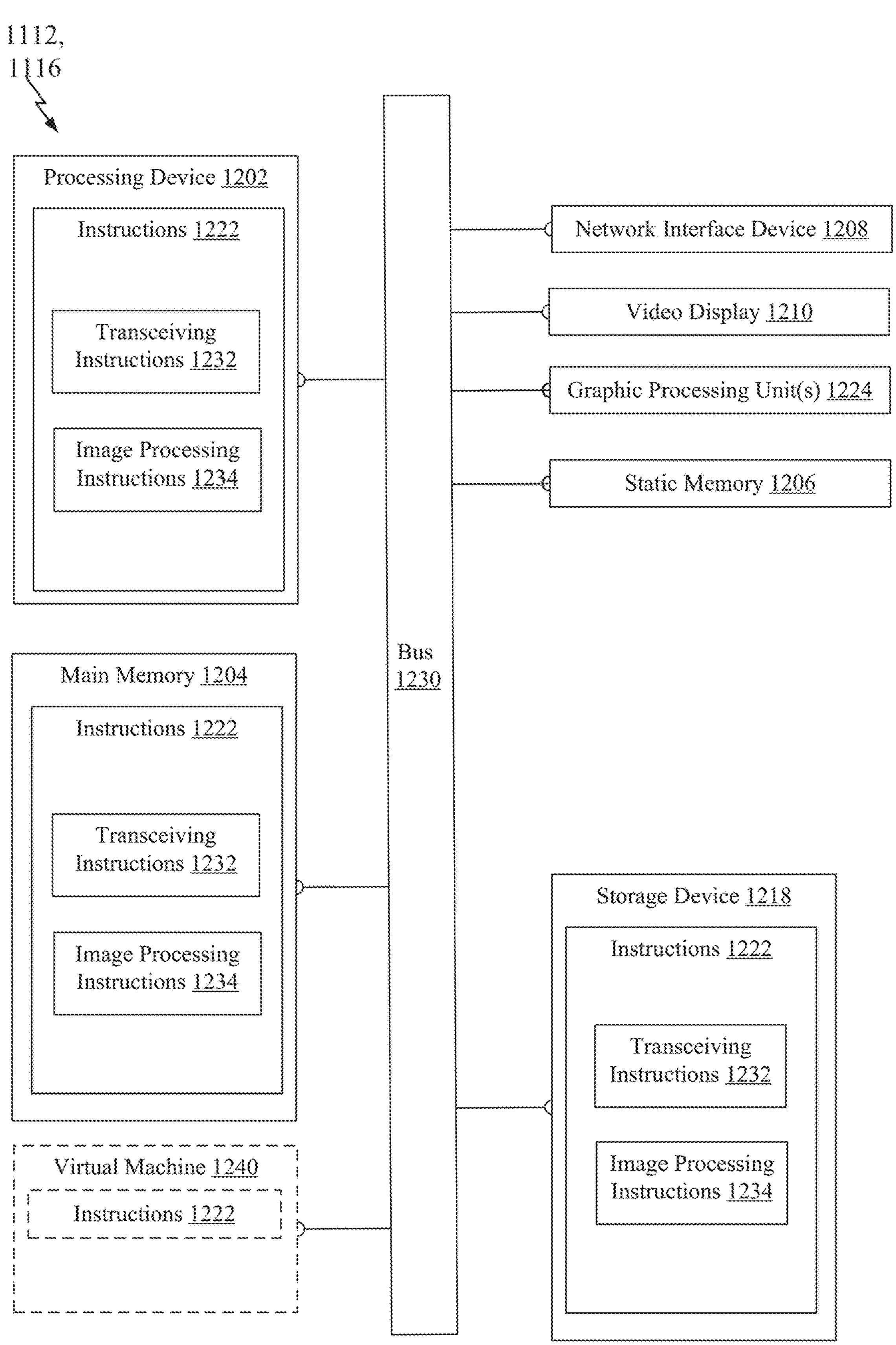
FIG. 12 is a block diagram conceptually illustrating an example of a hardware implementation for concepts disclosed herein.

FIG. 12 is a block diagram conceptually illustrating an example of hardware of an apparatus (e.g., computing device 1112 and/or server 1116) within which a set of instructions, for causing the apparatus to perform any one or more of the methods disclosed herein, may be executed. In alternative implementations, the apparatus may be connected (such as networked) to other apparatus in a LAN, an intranet, an extranet, and/or the Internet.

The apparatus may operate in the capacity of a server or a client machine in a client-server network environment, as a peer machine in a peer-to-peer (or distributed) network environment, or as a server or a client machine in a cloud computing infrastructure or environment. The apparatus may be a server computer, a personal computer (PC), a tablet PC, a set-top box (STB), a Personal Digital Assistant (PDA), a cellular telephone, a web appliance, a server, a network router, a switch or bridge, or any apparatus capable of executing a set of instructions (sequential or otherwise) that specify actions to be taken by that apparatus. Further, while a single apparatus is illustrated, the term "apparatus" shall also be taken to include any collection of apparatuses that individually or jointly execute a set (or multiple sets) of instructions to perform any one or more of the methods discussed herein.

The example apparatus 1112, 1116 includes a processing device 1202, a main memory 1204 (such as read-only memory (ROM), flash memory, dynamic random access memory (DRAM) such as synchronous DRAM (SDRAM) or DRAM, etc.), a static memory 1206 (such as flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, and the like. The processing device 1202 is configured to execute instructions 1222 for performing the operations and steps discussed herein.

The apparatus 1200 may further include a network interface device 1208 for connecting to the LAN, intranet, interne, and/or the extranet. The apparatus 1200 also may include a video display unit 1210 (such as a liquid crystal display (LCD) or a cathode ray tube (CRT)), and a graphic processing unit 1224 (such as a graphics card).

The data storage device 1218 may be a machine-readable storage medium 1228 (also known as a computer-readable medium) on which is stored one or more sets of instructions or software 1222 embodying any one or more of the methods or functions described herein. The instructions 1222 may also reside, completely or at least partially, within the main memory 1204 and/or within the processing device 1202 during execution thereof by the computer system 1200, the main memory 1204 and the processing device 902 also constituting machine-readable storage media.

In one implementation, the instructions 1222 include transceiving instructions for receiving a visible image and a cross-spectrum image; providing the cross-spectrum image to the trained neural network; receiving from the trained neural network a representation of the cross-spectrum image; and/or provide an identity of the person in the cross-spectrum image at blocks 920, 930, 940, and/or 960 of FIG. 9 and/or blocks 1010 and/or 1030 of FIG. 10. The instructions 1222 may further include image processing instructions 1234 for training a neural network using visible images of people and cross-spectrum images of the people in different poses; predicting an identity of the person in the cross-spectrum image based on a comparison of the representation of the cross-spectrum image and a representation of a visible image of the person; generating representations of the visible image and the cross-spectrum image using a modified base architecture; modifying the representation of the cross-spectrum image by performing face frontalization and cross-domain transformation using a domain adaptation sub-network; filtering the representation of the visible image and the modified representation of the cross-spectrum image using a shared grouped convolution layer; performing a pose-correction loss function between the filtered representation of the visible image and the filtered modified representation of the cross-spectrum image; and/or performing a cross-spectrum loss function for the filtered modified representation of the cross-spectrum image with the identity of the person at blocks 910, and/or 950 of FIG. 9 and/or at blocks 1020, 1040, 1050, 1060, 1070, and/or 1080 of FIG. 10.

While the machine-readable storage medium 1218 is shown in an example implementation to be a single medium, the term "machine-readable storage medium" should be taken to include a single medium or multiple media (such as a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media. The term "machine-readable storage medium" shall accordingly exclude transitory storage mediums such as signals unless otherwise specified by identifying the machine-readable storage medium as a transitory storage medium or transitory machine-readable storage medium.

In another implementation, a virtual machine 1240 may include a module for executing instructions such as transceiving instructions 1232, and/or image processing instructions 1334. In computing, a virtual machine (VM) is an emulation of a computer system. Virtual machines are based on computer architectures and provide functionality of a physical computer. Their implementations may involve specialized hardware, software, or a combination of hardware and software.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for cross-spectrum face recognition, comprising:

receiving a visible image of a person;

receiving a cross-spectrum image of the person;

training a neural network based on both the visible image and the cross-spectrum image by:

extracting a first representation from the visible image using a modified neural network architecture;

extracting a second representation from the cross-spectrum image based on the modified neural network architecture;

converting the second representation to a modified representation using a domain adaptation sub-network, the domain adaptation sub-network comprising: a first residual block and a second residual block being immediately subsequent to the first block, the first residual block having the second representation as an input, the second residual block having the second representation and an output of the first residual block as an input, the modified representation being based on the second representation, the output of the first block, and an output of the second block;

minimizing a distance between the first representation and the modified representation using a pose-correction loss function, wherein the pose-correction loss function is defined as $L_p=\Sigma\|V_i-\hat{T}_i\|^2$, where V is the first representation, and $\hat{T}$ is the modified representation; and updating parameters of the neural network based on the modified representation.

2. The method of claim 1, wherein the visible image comprises a frontal face image of the person, and wherein the cross-spectrum image comprises an off-pose face image of the person, the off-pose face image being at least one of a non-frontal face image, a facial image with varying expressions, or a facial expression with an object on the face.

3. The method of claim 1, further comprising:

arranging a center of eyes, a nose, and corners of a mouth of the person to be disposed at a center of each of the visible image and the cross-spectrum image; and resizing the visible image and the cross-spectrum image to a predetermined size.

4. The method of claim 1, wherein the modified neural network architecture comprises a truncated trained neural network architecture.

5. The method of claim 1, wherein the modified neural network architecture comprises a truncated visual geometry group with 16 layers (VGG16) or a truncated deep residual network with 50 layers (Resnet50).

6. The method of claim 5, wherein the truncated VGG16 comprises a fourth convolutional-pooling block, and wherein the truncated Resnet50 comprises a fifth convolutional group from a fourth residual block.

7. The method of claim 5, wherein a resulting spatial dimension of the truncated VGG16 or the truncated ResNet50 is 14×14, and wherein the truncated VGG16 and the truncated ResNet50 use 512 channels and 1024 channels, respectively.

8. The method of claim 5, wherein the modified neural network architecture further comprises a shared compression layer, wherein the shared compression layer receives a first input from the truncated VGG16 and a second input from the truncated Resnet50 and produces the first representation and the second representation, and wherein the shared compression layer reduces an effect of a noise and a number of parameters in a subsequent layer.

9. The method of claim 1, wherein the first residual block uses a Tanh activation function, and wherein the second residual block uses a ReLu activation function.

10. The method of claim 1, wherein the first residual block comprises three 1×1 convolutional layers, wherein the second residual block comprises two 1×1 convolutional layers.

11. The method of claim 9, wherein the output of the first residual block is determined by:

$$F(x) = Conv_c \circ Conv_{200} \circ Conv_{200}(x) + x,$$

where F (x) is the output of the first residual block, $Conv_k$ corresponds to a 1×1 convolutional layer with k units, x is the input of the first residual block, and c is a number of channels in the input of the first residual block, and wherein the output of the second residual block is determined by:

$$G(x) = Conv_c \circ Conv_c(F(x)) + F(x),$$

where G (x) is the output of the second residual block, and F (x) is the input of the second residual block.

12. The method of claim 1, wherein the training the neural network further comprises:

learning a discriminative feature between the first representation and the modified representation and simultaneously maintaining an identity of the person using a cross-spectrum loss function, wherein the cross-spectrum loss function is defined as: $L_c = -\Sigma y \cdot \log\, \hat{y}\ (\hat{T};\ \Theta_v)$, where y is the identity of the person, $\hat{y}(\hat{T};\ \Theta_v)$ is a predicted identity of the person, and $\hat{T}$ is the modified representation.

13. The method of claim 12, wherein the training the neural network further comprises:

using a joint-loss function to update the parameters of the neural network, wherein the joint-loss function is a weighted sum of the cross-spectrum loss function and the pose-correction loss function.

14. The method of claim 13, further comprising:

training the first representation for a first predetermined number of epochs; and after the training the first representation, training the second representation for a second number of epochs, wherein training the second representation for the second number of epochs comprises:

converting the second representation to the modified representation; and using the joint-loss function.

15. A method for cross-spectrum face recognition, comprising:

receiving a cross-spectrum image of a person among people in a visible imagery;

providing the cross-spectrum image to a trained neural network, the trained neural network having been trained using both a first representation based on visual training images and a modified representation based on cross-spectrum training images by minimizing a distance between the first representation and the modified representation using a pose-correction loss function, wherein the pose-correction loss function is defined as $L_p = \Sigma \| V_i - \hat{T}_i \|^2$, where V is the first representation, and $\hat{T}$ is the modified representation, the trained neural network comprising:

a trained feature extraction convolutional neural network (CNN); and a domain adaptation sub-network, the domain adaptation sub-network converting a cross-spectrum representation of the cross-spectrum image generated by the trained feature extraction CNN to the modified representation;

receiving, from the trained neural network, a representation of the cross-spectrum image;

predicting an identity of the person in the cross-spectrum image based on a comparison of the representation of the cross-spectrum image and a representation of a visible image of the person in the visible imagery; and presenting the identity the person in the cross-spectrum image.

16. A method for face recognition, comprising:

receiving an off-pose visible spectrum image of a person among people in a visible imagery;

providing the off-pose visible spectrum image to a trained neural network, the trained neural network having been trained using both a first representation based on visual training images and a modified representation based on cross-spectrum training images by minimizing a distance between the first representation and the modified representation using a pose-correction loss function, wherein the pose-correction loss function is defined as $L_p = \Sigma \| V_i - \hat{T}_i \|^2$, where V is the first representation, and $\hat{T}$ is the modified representation, the trained neural network comprising:

a trained feature extraction convolutional neural network (CNN); and a domain adaptation sub-network, the domain adaptation sub-network converting an off-pose representation of the off-pose visible spectrum image generated by the trained feature extraction CNN to the modified representation;

receiving, from the trained neural network, the modified representation of the off-pose visible spectrum image;

predicting an identity of the person in the off-pose visible spectrum image based on a comparison of the representation of the off-pose visible spectrum image and a representation of a visible image of the person in the visible imagery; and presenting the identity the person in the off-pose visible image.

17. The method of claim 16, wherein the domain adaptation sub-network comprises a first residual block and a second residual block being immediately subsequent to the first residual block, the first residual block having the off-pose representation as an input of the first residual block, the second residual block having the off-pose representation and an output of the first residual block as an input of the second residual block, the modified representation being based on the off-pose representation, the output of the first residual block, and an output of the second residual block.

18. The method of claim 17, wherein the output of the first residual block is determined by:

$$F(x) = Conv_c \circ Conv_{200} \circ Conv_{200}(x) + x,$$

where F (x) is the output of the first residual block, Convk corresponds to a 1×1 convolutional layer with k units, x is the input of the first residual block, and c is a number of channels in the input of the first residual block, and wherein the output of the second residual block is determined by:

$$G(x) = Conv_c \circ Conv_c(F(x)) + F(x),$$

where G (x) is the output of the second residual block, and F (x) is the input of the second residual block.

19. The method of claim 16, wherein the trained neural network comprises a truncated visual geometry group with 16 layers (VGG16) or a truncated deep residual network with 50 layers (Resnet50).

* * * * *